US012252919B2

(12) United States Patent
Griswold et al.

(10) Patent No.: US 12,252,919 B2

(45) Date of Patent: Mar. 18, 2025

(54) DOOR OPERATOR SYSTEM WITH ADAPTOR AND BACK PLATE

(71) Applicant: ASSA ABLOY Accessories and Door Controls Group, Inc., Monroe, NC (US)

(72) Inventors: Lee Griswold, Bethel, CT (US); Tommy McNally, Indian Trail, NC (US)

(73) Assignee: ASSA ABLOY Accessories and Door Controls Group, Inc., Monroe, NC (US)

( * ) Notice: Subject to any disclaimer, the term of this patent is extended or adjusted under 35 U.S.C. 154(b) by 0 days.

(21) Appl. No.: 18/196,606

(22) Filed: May 12, 2023

(65) Prior Publication Data

US 2023/0279714 A1 Sep. 7, 2023

Related U.S. Application Data

(63) Continuation of application No. 16/848,216, filed on Apr. 14, 2020, now Pat. No. 11,686,142.

(Continued)

(51) Int. Cl.

*E05F 11/00* (2006.01)
*E05F 15/60* (2015.01)
*E05F 17/00* (2006.01)

(52) U.S. Cl.

CPC ............ *E05F 15/60* (2015.01); *E05F 17/004* (2013.01); *E05F 2017/008* (2013.01); *E05Y 2201/10* (2013.01); *E05Y 2900/132* (2013.01)

(58) Field of Classification Search

CPC ................ E05F 15/60; E05Y 2201/10; E05Y 2400/415; E05Y 2400/61; E05Y 2400/654;

(Continued)

(56) References Cited

U.S. PATENT DOCUMENTS 2,708,711 A 5/1955 McGinty et al.
3,331,428 A 7/1967 Ford (Continued)

FOREIGN PATENT DOCUMENTS

CN 113719211 A 11/2021
DE 3941711 A1 6/1990

(Continued)

OTHER PUBLICATIONS

Assa Abloy Accessories and Door Controls Group, Inc., Canadian Patent Application No. 3,131,940, Office Action, Oct. 18, 2023.

(Continued)

*Primary Examiner* — Jerry E Redman

(74) *Attorney, Agent, or Firm* — Moore & Van Allen PLLC; Jeffrey R. Gray

(57) ABSTRACT

Door operator systems are described herein that include the use of an adaptor. It should be understood that the adaptor may be utilized in order to operatively couple separate door operator assemblies together in a double door operator system. The adaptor may include control components (e.g., switches, buttons, toggles, levers, or the like) that are used to turn the door operator system on and off. While the adaptor may be used to operatively couple two separate door operator assemblies together to form a double door operator system, the adaptor may also be used within a single door operator system. Furthermore, with respect to double door operator systems, the system may also utilize a back plate assembly comprising two or more separate back plates (e.g., two or more back plate portions).

16 Claims, 26 Drawing Sheets

Related U.S. Application Data

(60) Provisional application No. 62/834,018, filed on Apr. 15, 2019.

(58) Field of Classification Search
CPC ........... E05Y 2600/452; E05Y 2600/60; E05Y 2800/12; E05Y 2800/17; E05Y 2800/20; E05Y 2800/205; E05Y 2800/72
See application file for complete search history.

(56) References Cited

U.S. PATENT DOCUMENTS

| | | | | |
|---|---|---|---|---|
| 3,494,073 | A | 2/1970 | Meddick | |
| 3,867,621 | A | 2/1975 | Gewfrtz et al. | |
| 6,177,771 | B1 * | 1/2001 | Kinzer | G05B 19/291 318/467 |
| 8,291,642 | B2 | 10/2012 | Jankovsky | |
| 10,544,933 | B2 | 1/2020 | Hand et al. | |
| D883,548 | S | 5/2020 | Hand et al. | |
| 10,995,534 | B1 | 5/2021 | Dixon et al. | |
| 11,053,727 | B2 | 7/2021 | Houk | |
| 2003/0110696 | A1 | 6/2003 | Rennetaud et al. | |
| 2005/0193632 | A1 * | 9/2005 | Orban | E05F 15/73 49/340 |
| 2005/0274078 | A1 | 12/2005 | Gilchrist | |
| 2007/0251150 | A1 | 11/2007 | Harie | |
| 2011/0031374 | A1 | 2/2011 | Drux et al. | |
| 2013/0298706 | A1 | 11/2013 | Linnenkohl et al. | |
| 2019/0271189 | A1 | 9/2019 | Ratliff | |
| 2019/0309551 | A1 | 10/2019 | Hawkinson et al. | |
| 2020/0071983 | A1 | 3/2020 | Ottmann et al. | |
| 2020/0325719 | A1 | 10/2020 | Griswold et al. | |
| 2023/0279714 | A1 * | 9/2023 | Griswold | E05F 17/004 49/70 |

FOREIGN PATENT DOCUMENTS

| | | | | | |
|---|---|---|---|---|---|
| DE | 20320657 | U1 | * | 12/2004 | E05F 15/53 |
| DE | 102009004497 | A1 | | 7/2010 | |
| DE | 102009004498 | A1 | | 7/2010 | |
| DE | 102010021264 | A1 | | 2/2011 | |
| DE | 102009051167 | A1 | | 5/2011 | |
| DE | 102011078395 | B3 | | 5/2012 | |
| DE | 102013103594 | A1 | | 10/2014 | |
| DE | 102014115921 | A1 | | 5/2016 | |
| DE | 202015104026 | U1 | * | 12/2016 | E05F 15/63 |
| DE | 202021000337 | U1 | * | 4/2021 | E05D 15/0621 |
| EP | 2206866 | A2 | * | 7/2010 | E05F 1/006 |
| GB | 295138 | A | | 8/1928 | |
| WO | WO-03054333 | A2 | * | 7/2003 | E05F 15/43 |
| WO | WO-2009062706 | A2 | * | 5/2009 | E05F 15/603 |
| WO | WO-2011057652 | A1 | * | 5/2011 | E05F 15/63 |
| WO | WO-2020027201 | A1 | * | 2/2020 | E05F 15/43 |

OTHER PUBLICATIONS

Assa Abloy Accessories and Door Controls Group, Inc., International Application No. PCT/US2020/028126, Invitation to Pay Additional Fees, Partial International Search, and Provisional Opinion, Jul. 20, 2020.

Assa Abloy Accessories and Door Controls Group, Inc., International Application No. PCT/US2020/028126, International Search Report and Written Opinion, Sep. 16, 2020.

Assa Abloy Accessories and Door Controls Group, Inc., International Patent Application No. PCT/US2020/028126, International Preliminary Report on Patentability, Oct. 28, 2021.

Assa Abloy Accessories and Door Controls Group, Inc., European Patent Application No. 20722962.6, Communication pursuant to Rule 164(2)(b) and Article 94(3) EPC, Mar. 19, 2024.

Assa Abloy Accessories and Door Controls Group, Inc., Canadian Patent Application No. 3,131,940, Office Action, Sep. 17, 2024.

* cited by examiner

DOOR OPERATOR SYSTEM WITH ADAPTOR AND BACK PLATE

CROSS REFERENCE AND PRIORITY CLAIM UNDER 35 U. S. C. § 119

The present Application for a Patent claims priority to U.S. patent application Ser. No. 16/848,216 entitled "Door Operator System with Adaptor and Back Plate," filed on Apr. 14, 2020, which issued into U.S. Pat. No. 11,686,142, and which claims priority to U.S. Provisional Patent Application Ser. No. 62/834,018 entitled "Door Operator System with Adaptor and Back Plate," filed on Apr. 15, 2019, both of which are assigned to the assignees hereof and hereby expressly incorporated by reference herein.

FIELD

This application relates generally to door operator systems, and more particularly to single and/or double door operator system having an adaptor and/or back plate assembly for use with single or double doors.

BACKGROUND

A door operator system is a device that opens and/or closes a door or other barrier, or that provides assistance in opening and/or closing a door or other barrier. Door operator systems typically include a motor that is connected to a door via a linkage to control motion of the door. These components of door operators are covered by a housing. Door operator systems may be utilized to open a single door or double doors, and as such, door operator systems come in a variety of styles and configurations, and depending on the installation requirements may require specialized components which may be bulky and make it difficult to install and service such door operator systems.

BRIEF SUMMARY

The present disclosure relates to door operator systems that include the use of an adaptor. It should be understood that the adaptor may be utilize in order to operatively couple the separate door operator assemblies together in a double door operator system, in particular, separate housings and/or other components of the separate door operator assemblies. In some embodiments, the adaptor may include control components (e.g., switches, buttons, toggles, levers, or the like) that are used to turn the door operator system, or the individual door operator assemblies (or components thereof), on and off. Furthermore, while the adaptor may be used to operatively couple two separate door operator assemblies together to form a double door operator system, the adaptor (e.g., including the control component(s), or the like) may also be used within a single door operator system. As such, the same adaptor may be utilized in both double door operator systems and single door operator systems. Furthermore, with respect to double door operator systems, these systems may also utilize a back plate assembly (e.g., operator mount, bracket, support, and/or the like) comprising two or more separate members, such as back plates (e.g., two or more back plate portions). The back plate assembly may provide improved installation options. For example, a user (e.g., installer, or the like) may install one back plate at a time, or may pre-assemble multiple back plates, for installation on a mount surface (e.g., wall, frame, door, or the like). The back plate assembly may include additional features that provide improved installation options, which will be described in further detail herein.

Embodiments of the invention comprise a double door operator system. The system comprises a first operator assembly, a second operator assembly, a first housing for the first operator assembly, a second housing for the second operator assembly, and an adaptor operatively coupling the first housing to the second housing.

In further accord with embodiments of the system, the adaptor comprises one or more connectors operatively coupling the first housing and a first adaptor side or the second housing and a second adaptor side.

In other embodiments of the system, the adaptor further comprises one or more activation controls. The one or more activation controls operate the first operator assembly or the second operator assembly.

In still other embodiments of the system, the adaptor further comprises one or more covers for providing access and coverage over the one or more activation controls.

In yet other embodiments the system further comprises a first back plate and a second back plate operatively coupled to the first back plate. The first back plate is operatively coupled to the first housing and the second back plate is operatively coupled to the second housing.

In other embodiments of the system the first back plate or the second back plate are operatively coupled through a joint.

In further accord with embodiments of the system, the first back plate or the second back plate comprise one or more fingers or one or more finger apertures. The joint is formed through the operative coupling of the one or more fingers with the one or more finger apertures.

In other embodiments, the system further comprises a support member operatively coupled to the joint between the first back plate and the second back plate.

In still other embodiments, the first back plate or the second back plate comprise one or more mounting apertures. The one or more mounting apertures are open to allow positioning of the first back plate or the second back plate.

In yet other embodiments, the system further comprises a first end cap operatively coupled to the first housing, and a second end cap operatively coupled the second housing.

In other embodiments of the system, the one or more of the first end cap or the second end cap comprises an access portal for accessing a biasing member of the first operator assembly or the second operator assembly.

Embodiments of the invention comprise an adaptor configured to be used with a door operator system. The adaptor comprises a first face surface, a second face surface, and a front face surface operatively coupling the first face surface and the second face surface. The adaptor further comprises one or more control components operatively coupled to one or more of the first face surface, the second face surface, or the front face surface. The one or more control components are configured to activate or deactivate the door operator system. The adaptor is configured to be operatively coupled adjacent to either end of a housing of the door operator system.

In further accord with embodiments of the adaptor, the adaptor is configured to be operatively coupled to a first end of a single door operator assembly at a first adaptor end and an end cap at a second adaptor end.

In other embodiments, the adaptor is configured to operatively couple a first housing of a first operator assembly to a second housing of a second door operator assembly in a double door operator system.

In still other embodiments of the adaptor, the first face surface is configured to be operatively coupled with a single door operator activation control and the second face surface is configured to be operatively coupled with two door activation controls. The adaptor is reversible for use with a single door operator system or a double door operator system.

Embodiments of the invention comprise a back plate assembly for a double door operator. The back plate assembly comprises a first back plate and a second back plate operatively coupled to the first back plate. The first back plate is configured to be operatively coupled with a first housing of a first operator assembly, and the second back plate is configured to be operatively coupled with a second housing of a second operator assembly of the double door operator.

In further accord with embodiments of the back plate assembly, the first back plate and the second back plate are operatively coupled through a joint.

In other embodiments of the back plate assembly, the first back plate or the second back plate comprise one or more fingers or one or more finger apertures. The joint is formed through the operative coupling of the one or more fingers with the one or more finger apertures.

In still other embodiments of the back plate assembly, the first back plate or the second back plate comprise one or more mounting apertures. The one or more mounting apertures are open to allow positioning of the first back plate or the second back plate on a mounting surface for installation.

In yet other embodiments, the back plate assembly further comprises a support member operatively coupled to the joint between the first back plate and the second back plate.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF DRAWINGS

The foregoing and other advantages and features of the invention, and the manner in which the same are accomplished, will become more readily apparent upon consideration of the following detailed description of the invention taken in conjunction with the accompanying drawings, which illustrate embodiments of the invention and which are not necessarily drawn to scale, wherein.

DETAILED DESCRIPTION

Embodiments of the present disclosure now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Figure 1A:
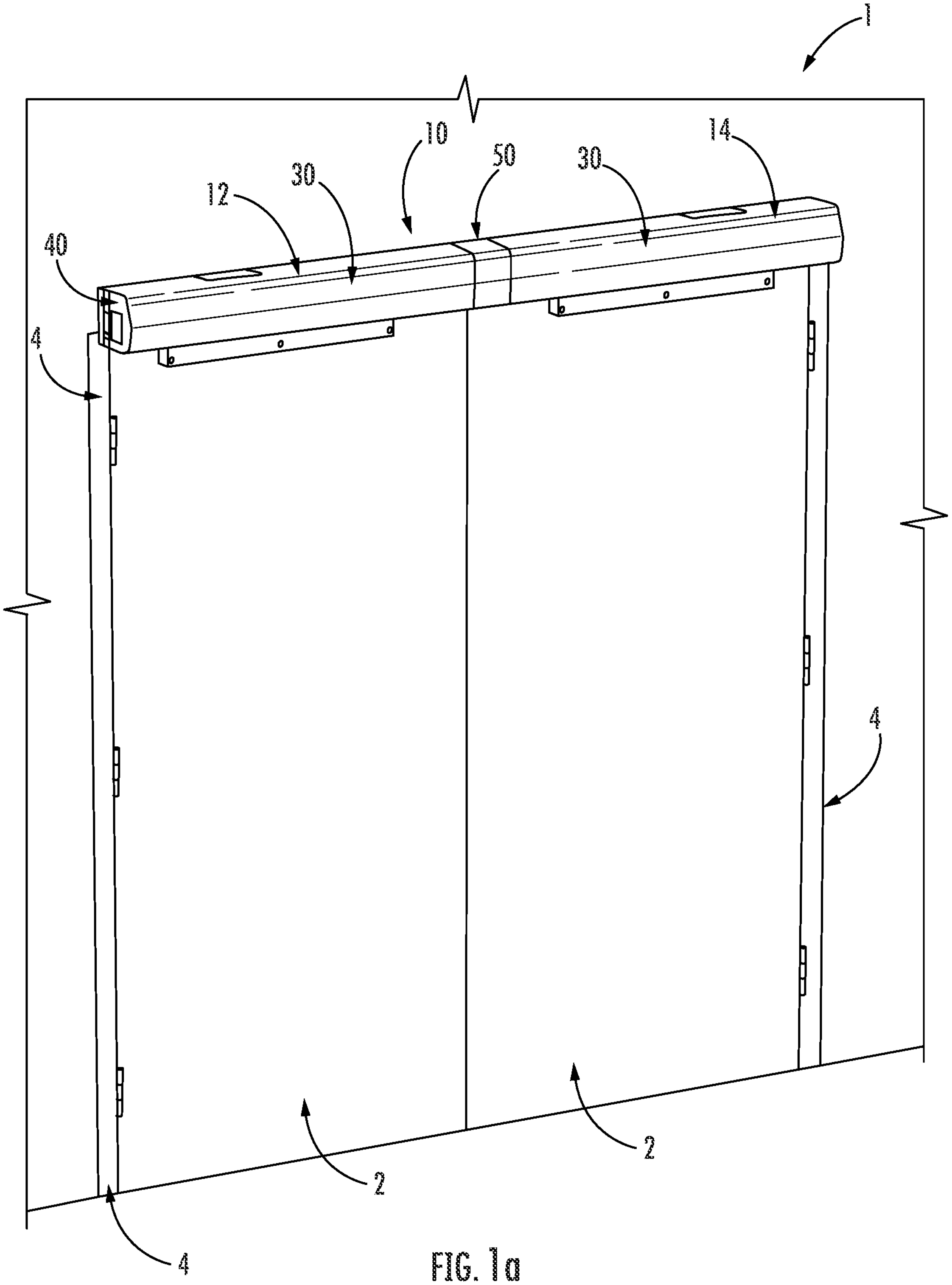
FIG. 1*a* illustrates a perspective view of the double door operator system installed on a double door, in accordance with embodiments of the present disclosure.
Figure 1B:
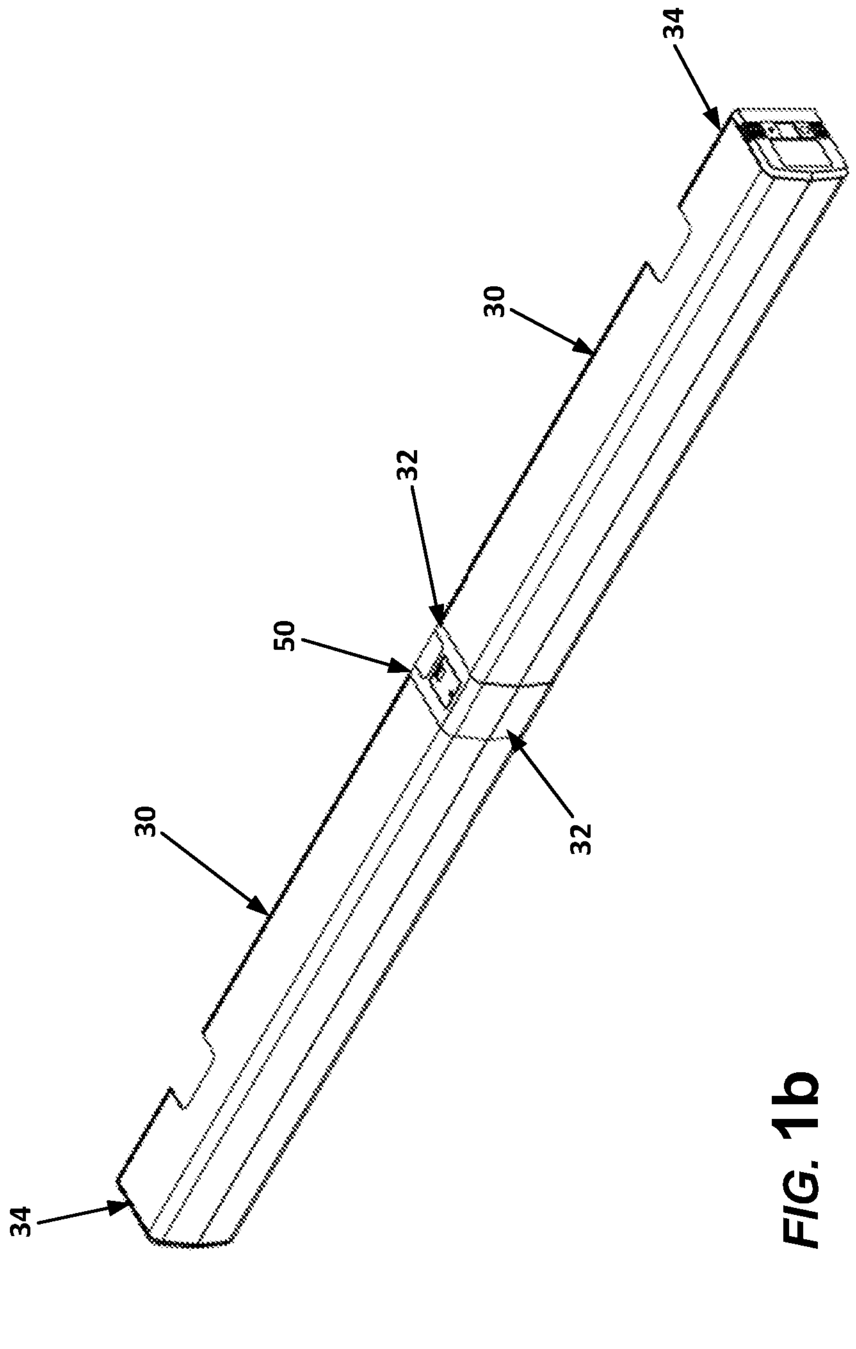
FIG. 1*b* illustrates a perspective view of a portion of the double door operator system, in accordance with embodiments of the present disclosure.
Figure 1C:
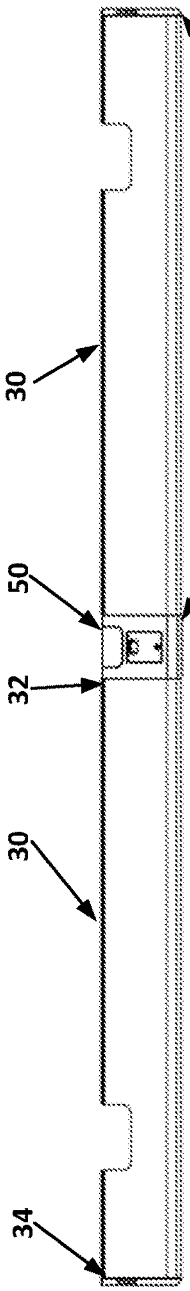
FIG. 1*c* illustrates a top view of a portion of the double door operator system, in accordance with embodiments of the present disclosure.
Figure 1D:
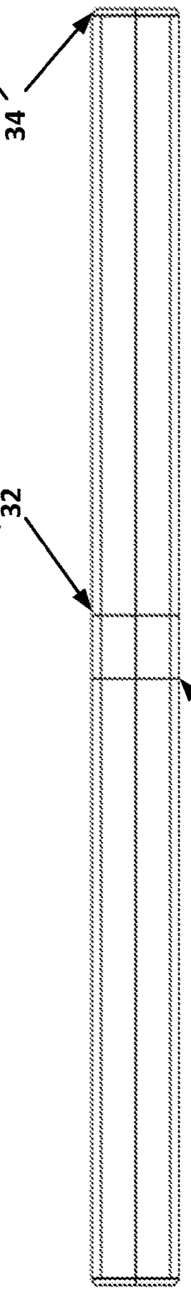
FIG. 1*d* illustrates a front view of a portion of the double door operator system, in accordance with embodiments of the present disclosure.
Figure 1E:
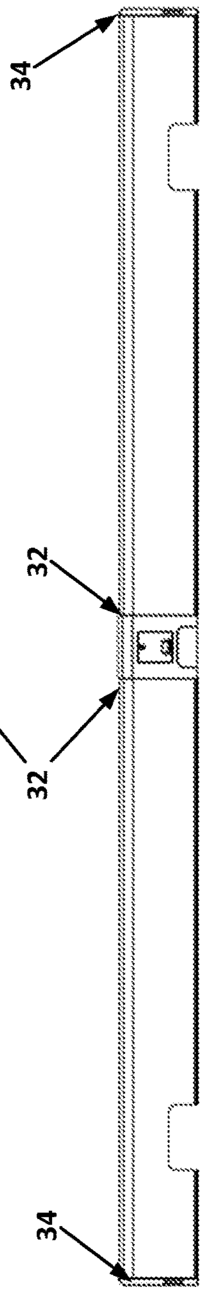
FIG. 1*e* illustrates a bottom view of a portion of the double door operator system, in accordance with embodiments of the present disclosure.

FIG. 1*a* illustrates a partial perspective view of a double door operator system 10 installed on doors 2 within a frame 4. While FIG. 1*a* illustrates that the double door operator system 10 is operatively coupled to the pulling side of the doors 2, the double door operator system 10 may be operatively coupled to the pushing side of the doors 2. As will be discussed in further detail herein, the double door operator system 10 may comprise two single door operator assemblies 20. The door operator assemblies 20 may have any number of components; however, in some embodiments each single door operator assembly 20 may comprise a motor 22, one or more linkages 24, a biasing member 26 (e.g., a spring, actuator, or the like), drive members (e.g., chains, gears, or the like), guards, electrical wiring, a housing 30, one or more end caps 40, and/or other components not specifically described herein. In the double door operator system 10 a first door operator assembly 12 (e.g., left hand operator) is operatively coupled to a second door operator assembly 14 (e.g., right hand operator) through the use of an adaptor 50. The adaptor 50, which will be discussed in further detail herein, may be utilized as a component to operatively couple two single door operator assemblies 12, 14 together into a double door operator system 10, while also being able to be utilized on either end of a housing 30 in a single door operator system 16 (e.g., same adaptor may be utilized in double or single door operator systems). As such, the adaptor 50 may be configured for operative coupling with the ends 32 of two adjacent housings 30 (as illustrated in FIG. 1*a*), or an end 32 of a housing 30 and with an end cap 40 (as illustrated in FIG. 2*a*), as will be discussed in further detail herein.

Figure 1F:
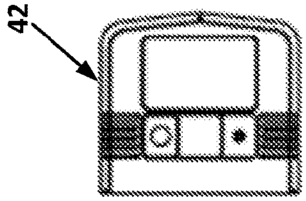
FIG. 1*f* illustrates a side view of a portion of the double door operator system, in accordance with embodiments of the present disclosure.
Figure 1G:
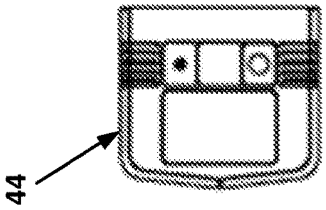
FIG. 1*g* illustrates a side view of a portion of the double door operator system, in accordance with embodiments of the present disclosure.

FIGS. 1*b* through 1*e* illustrate perspective, top, front, and bottom views of the double door operator system 10 including an adaptor 50, in accordance with embodiments of the present disclosure. It should be understood that in some embodiments the housings 30 may be interchangeable for either the first door operator assembly 12 or the second door operator assembly 14 in the double door operator system 10, or may be utilized in either a left hand orientation or right hand orientation in a single door operator system 16. The adapter 50 may be operatively coupled adjacent proximate ends 32 (e.g., at or near the proximate ends 32) of the door operator housings 30, while a first end cap 42 (e.g., illustrated by FIG. 1*f*) is operatively coupled to a distal end 34 of the first operator assembly 12 and a second end cap 44 (e.g., illustrated by FIG. 1*g*) is operatively coupled to a distal end 34 of the second operator assembly 14.

Figure 2A:
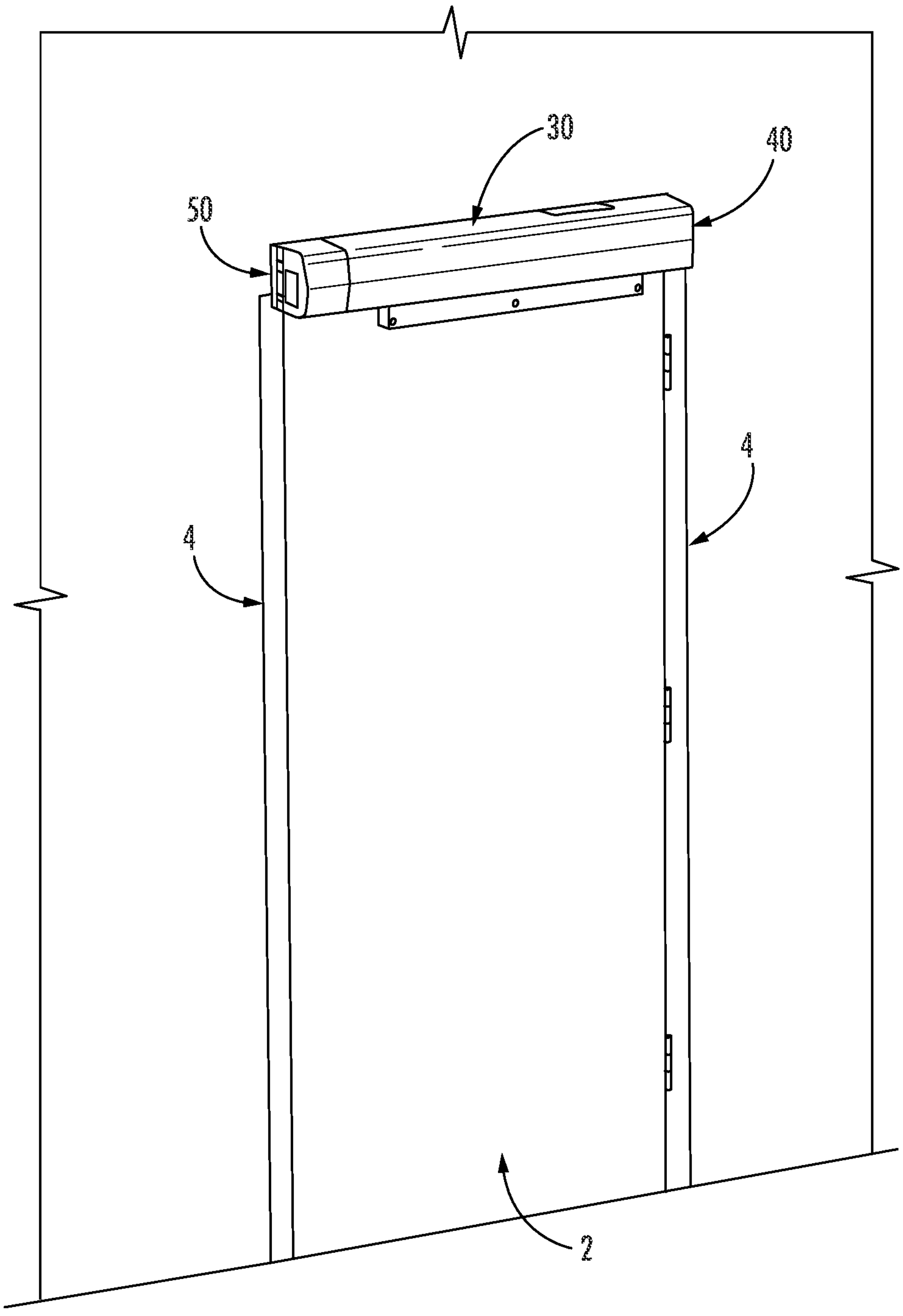
FIG. 2*a* illustrates a perspective view of a single door operator system installed on a single door, in accordance with embodiments of the present disclosure.
Figure 2B:
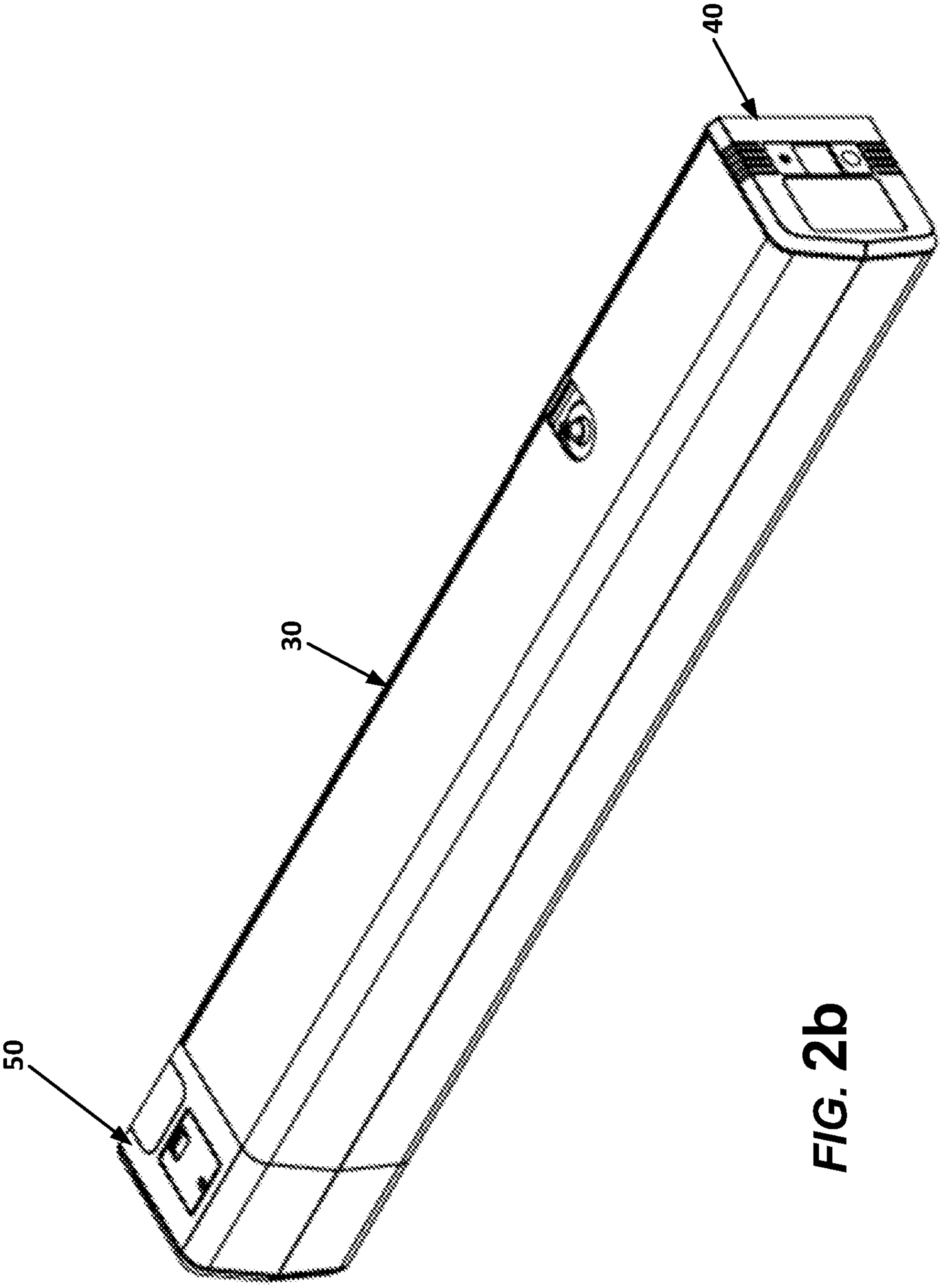
FIG. 2*b* illustrates a perspective view of a portion of the single door operator system, in accordance with embodiments of the present disclosure.
Figures 2C, 2D, 2E, 2F, 2G:
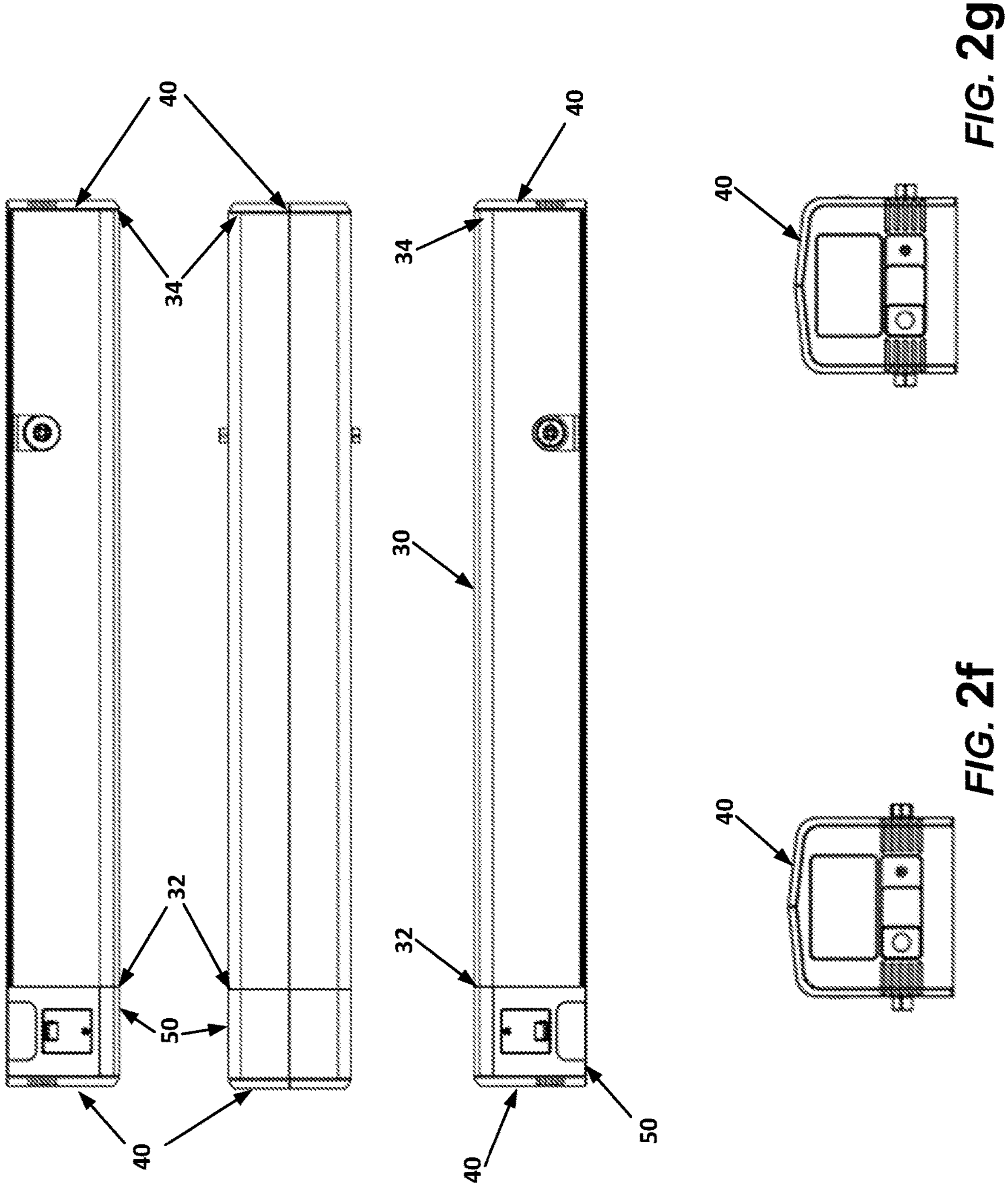
FIG. 2*c* illustrates a top view of a portion of the single door operator system, in accordance with embodiments of the present disclosure.
FIG. 2*d* illustrates a front view of a portion of the single door operator system, in accordance with embodiments of the present disclosure.
FIG. 2*e* illustrates a bottom view of a portion of the single door operator system, in accordance with embodiments of the present disclosure.
FIG. 2*f* illustrates a side view of a portion of the single door operator system, in accordance with embodiments of the present disclosure.
FIG. 2*g* illustrates a side view of a portion of the single door operator system, in accordance with embodiments of the present disclosure.

FIG. 2*a* illustrates a partial perspective view of a single door operator system 16 installed on a single door 2 on a frame 4. While FIG. 2*a* illustrates that the single door operator system 16 is operatively coupled to the pulling side of a door 2, the single door operator system 16 may be operatively coupled to the pushing side of a door 2. The single door operator system 16 may be operatively coupled to a door 2 such that it is a left hand operator system 16 or a right hand operator system 16.

Instead of being used to operatively couple two single door operator assemblies 12, 14 together to form a double door operator system 10, the adaptor 50 (e.g., the same adaptor that is used in the double door operator system) may be utilized on one end 32, 34 of the housing 30 of the single door operator system 16. As such, the adaptor 50 may be configured for operatively coupling with either end 32, 34 of a housing 30, while an end cap 40 is operatively coupled to the opposing end 32, 34 of the housing 30. It should be further understood that in some embodiments, as illustrated in FIGS. 2*a* through 2*g*, an end cap 40 may be operatively coupled to one end of the adaptor 50. FIGS. 2*b* through 2*e* illustrate perspective, top, front, and bottom views of the single operator system 16, including an adaptor 50, in accordance with embodiments of the invention. It should be further understood that in some embodiments the housing 30 may be utilized in either a left hand orientation or right hand orientation.

Figure 3A:
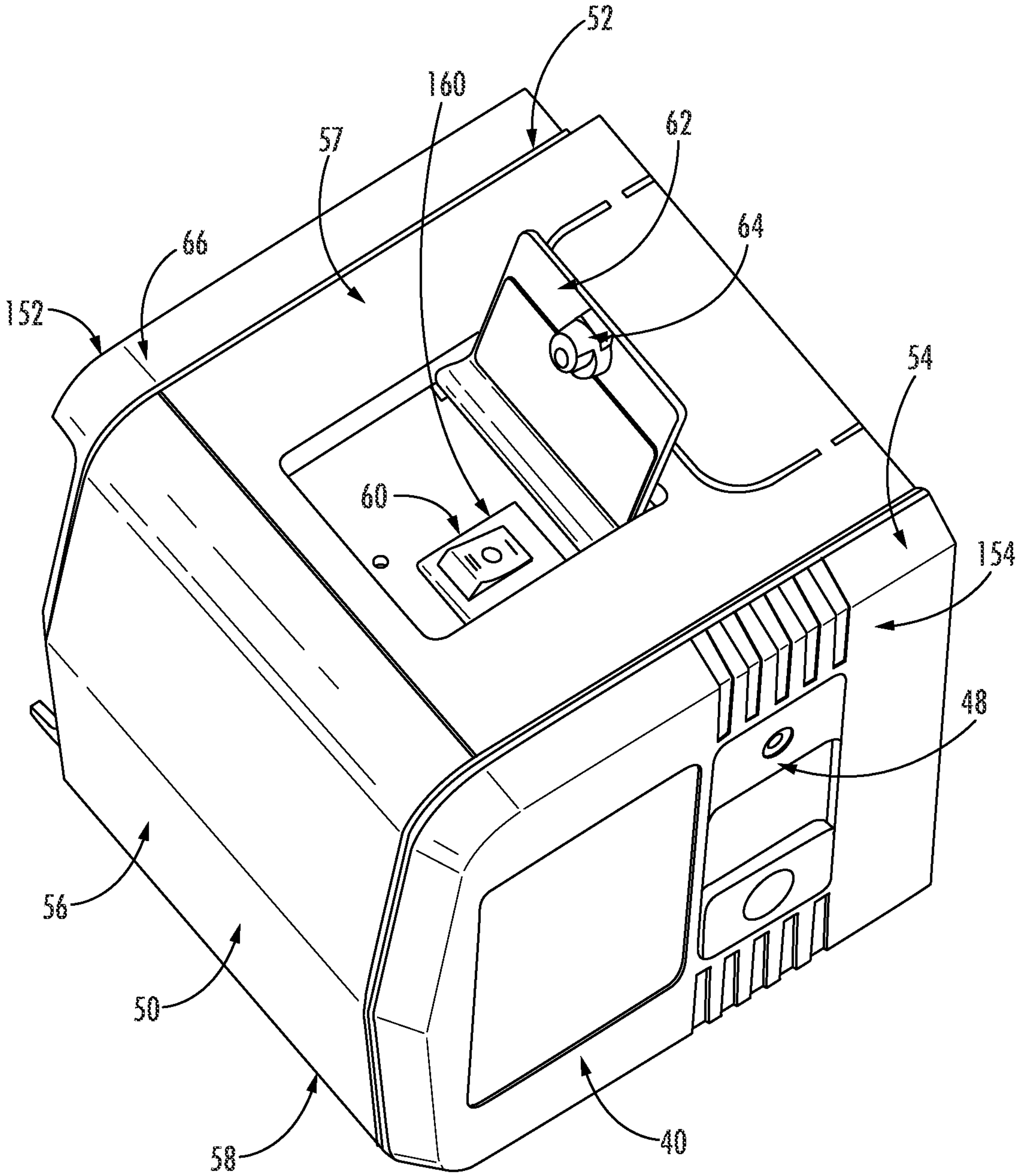
FIG. 3*a* illustrates a perspective view of an adaptor for a door operator system, in accordance with embodiments of the present disclosure.
Figure 3B:
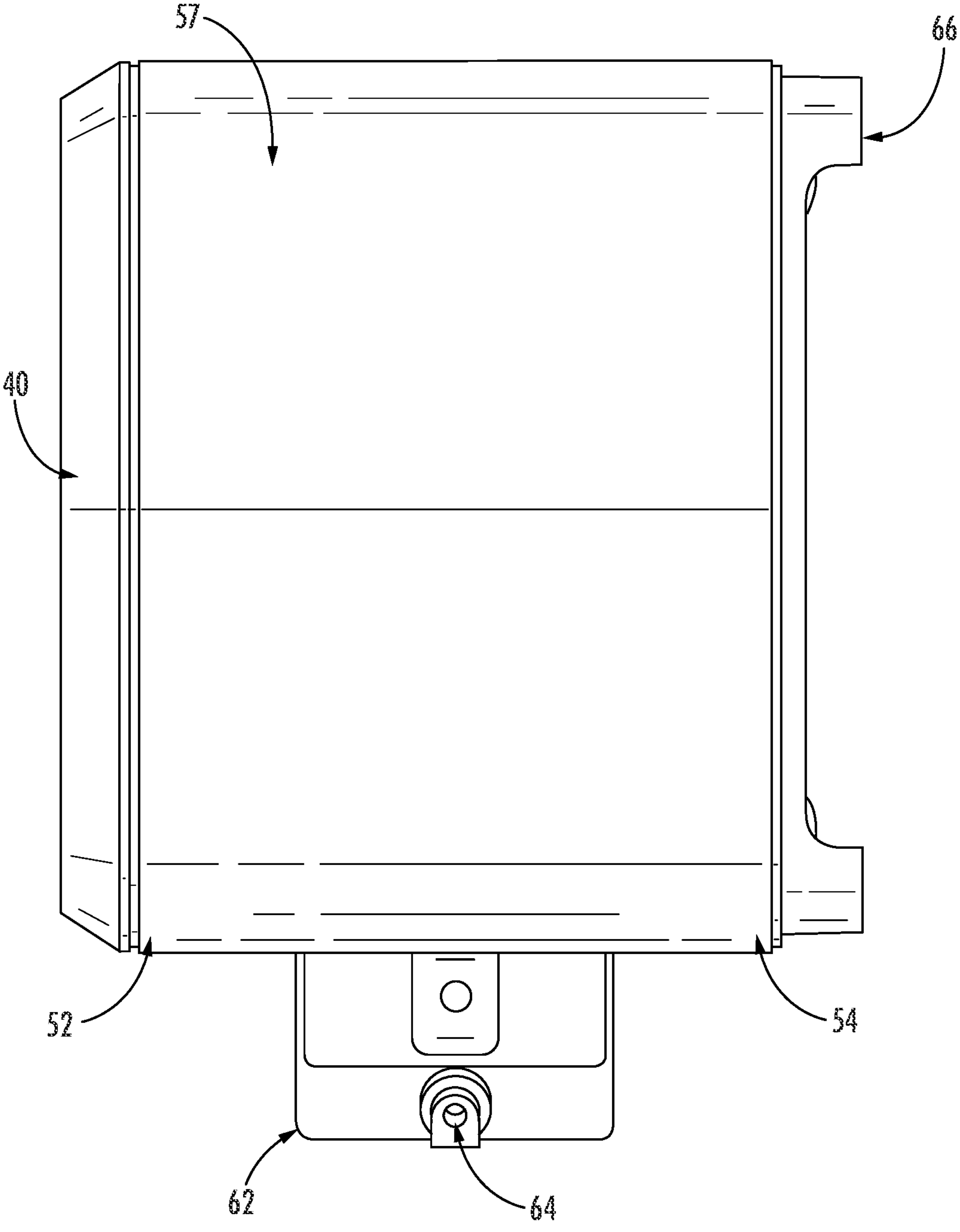
FIG. 3*b* illustrates a front view of the adaptor for a door operator system, in accordance with embodiments of the present disclosure.
Figure 3C:
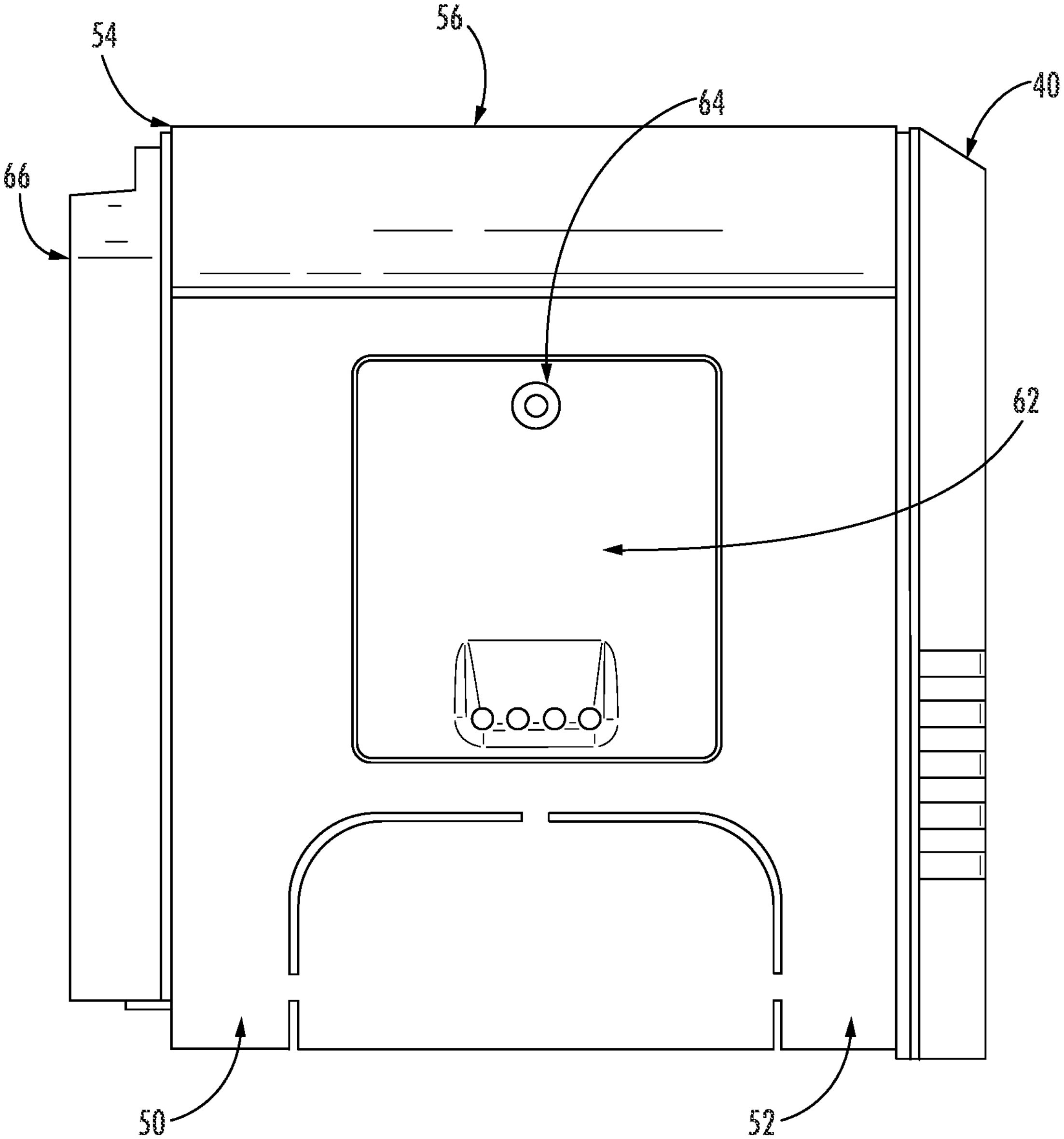
FIG. 3*c* illustrates a top view of the adaptor for a door operator system, in accordance with embodiments of the present disclosure.
Figure 3D:
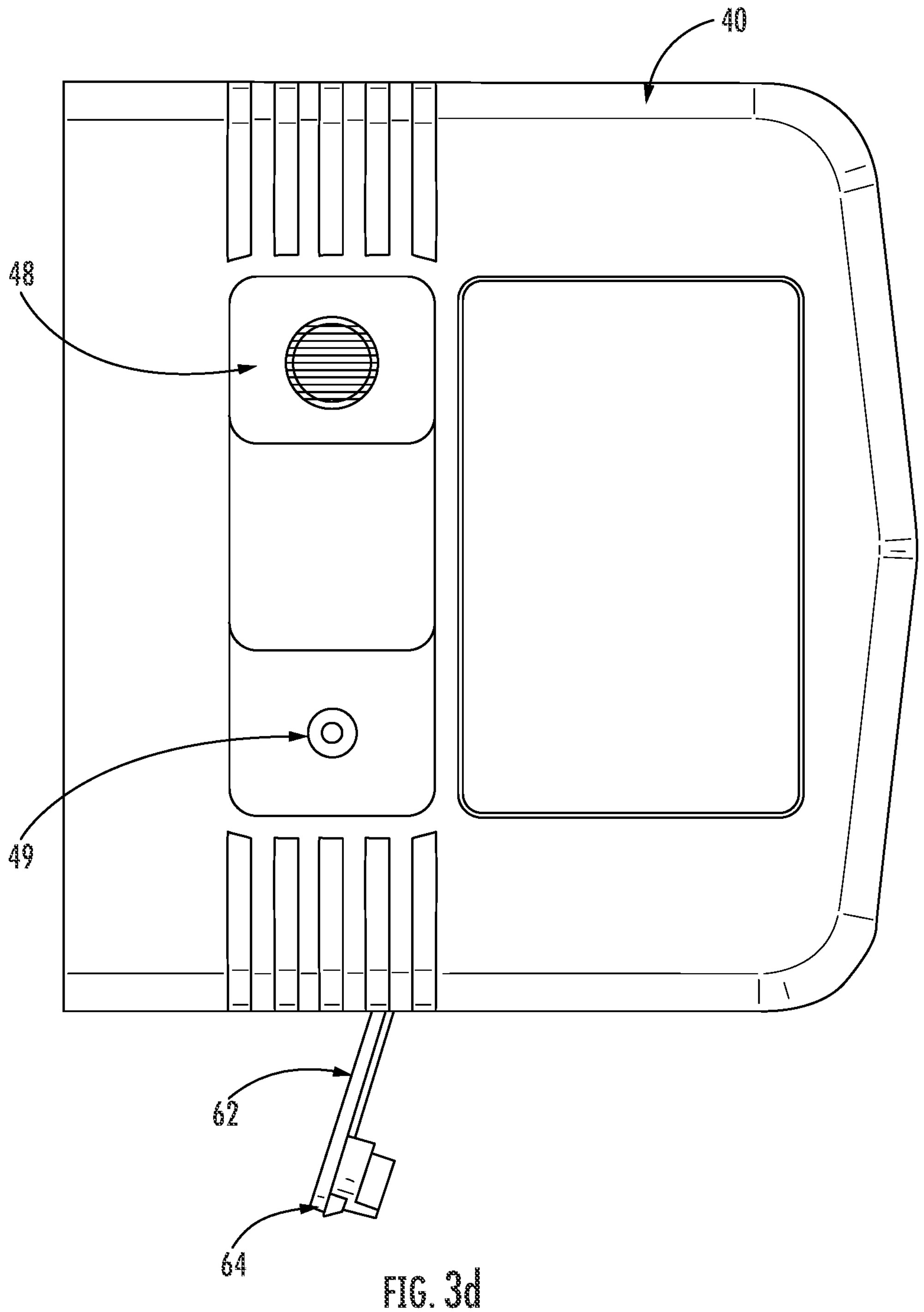
FIG. 3*d* illustrates a side view of the end cap of the adaptor for a door operator system, in accordance with embodiments of the present disclosure.
Figure 3E:
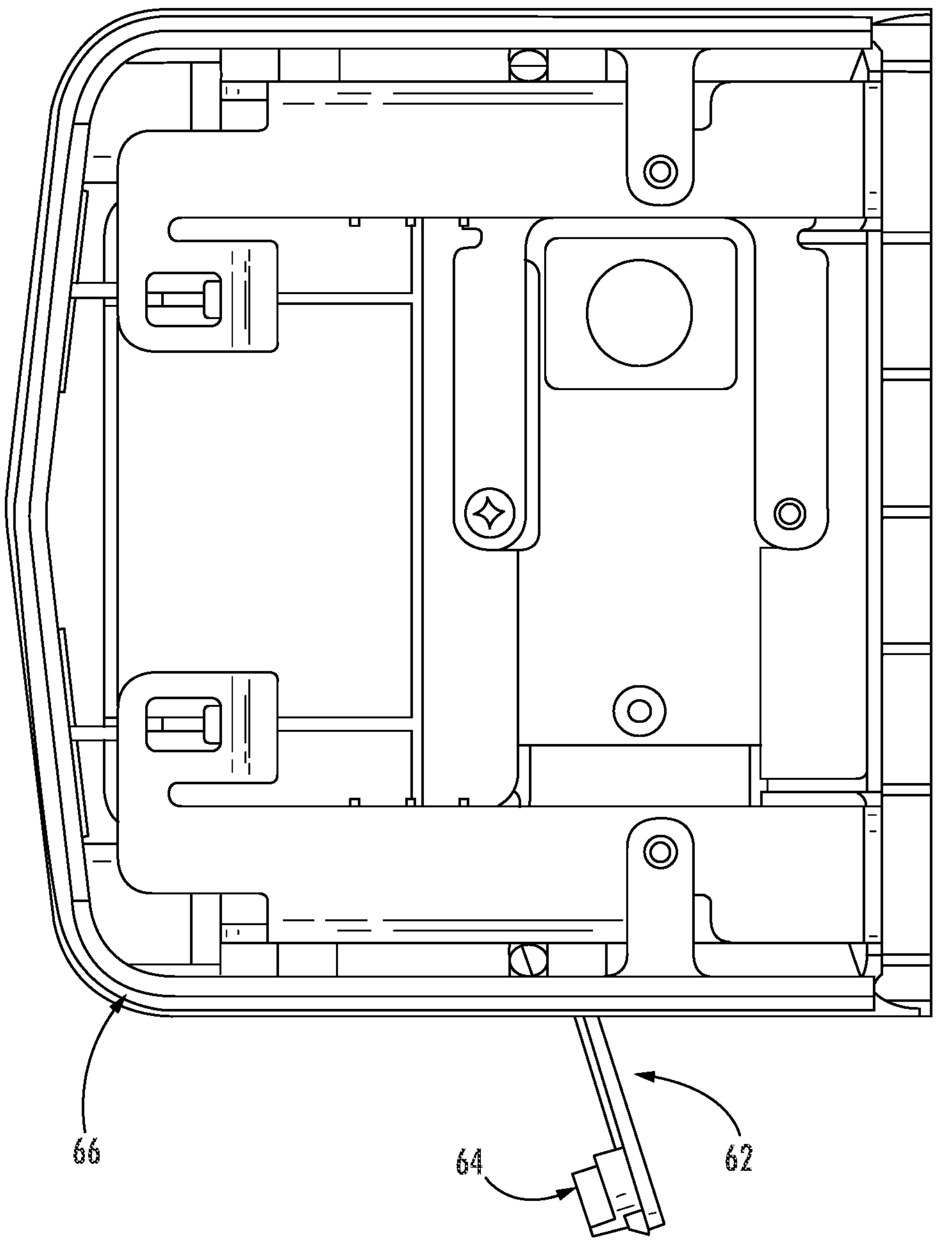
FIG. 3*e* illustrates a side view of the adaptor for a door operator system, in accordance with embodiments of the present disclosure.
Figure 3F:
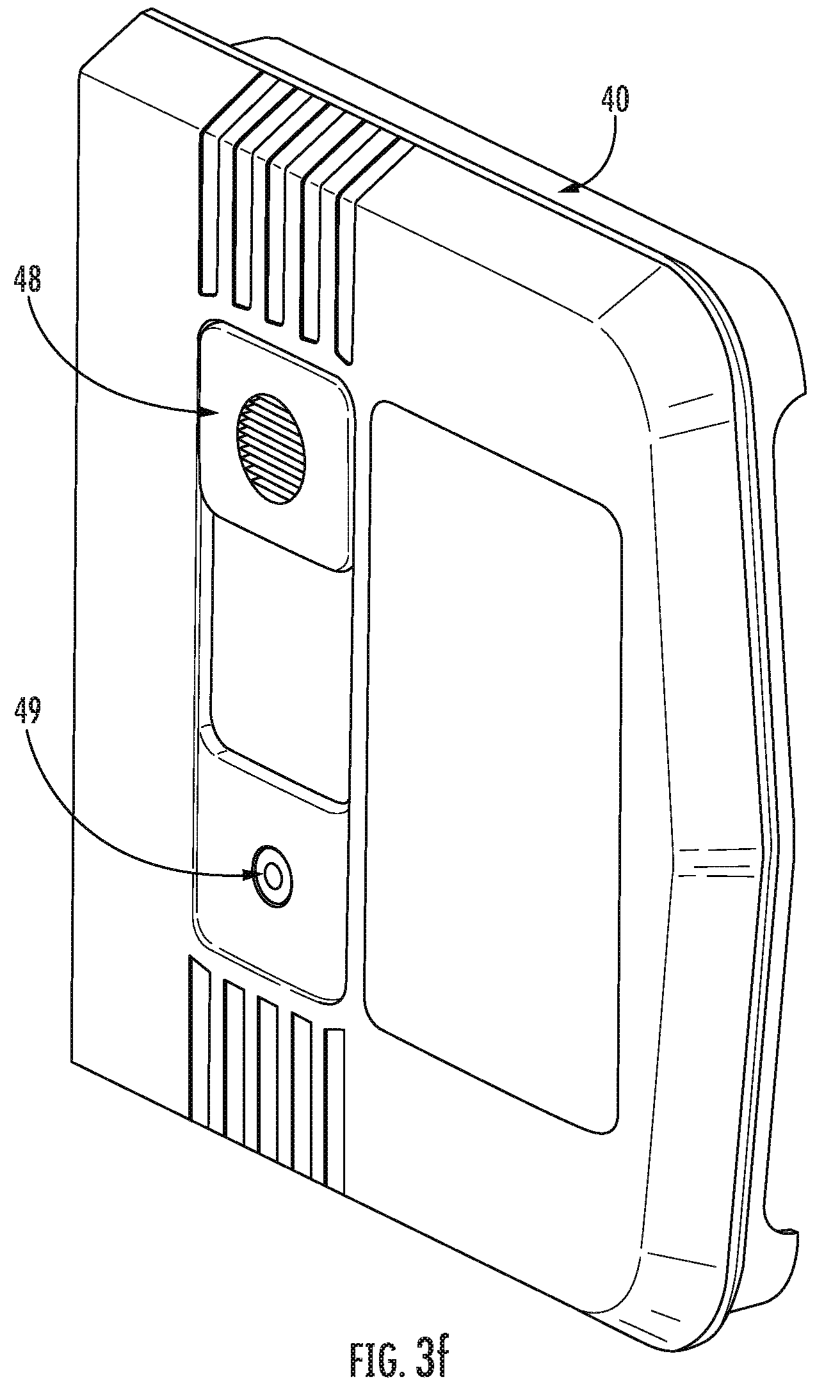
FIG. 3*f* illustrates a perspective view of an end cap for a door operator system, in accordance with embodiments of the present disclosure.

FIG. 3*a* illustrates a perspective view of the adaptor 50, in accordance with some embodiments of the invention. While FIG. 3*a* illustrates the adaptor 50 configured for use in a single door operator system 16, it should be understood that the same adaptor 50 may also be utilized in a double door operator system 10, as will be described in further detail with respect to FIGS. 3*h*-3*j*. Moreover, FIG. 3*b* illustrates a front view of the adaptor 50, FIG. 3*c* illustrates a top view of the adaptor 50, and FIG. 3*e* illustrates a side view of the adaptor 50. It should be understood that the adaptor 50 may be formed as a single component or as multiple components operatively coupled together. The adaptor 50 illustrated in FIG. 3*a* is configured for use with a single door operator system 16 (e.g., as illustrated in FIGS. 3*i* and 3*j*); however, as previously discussed herein, the adaptor 50 may be interchangeable such that it can be used as a union between single door operator assemblies 12, 14, in particular to form a union between housings 30 of two single door operator assemblies 12, 14 to form the double door operator system 10 (e.g., as illustrated in FIG. 3*h*). As illustrated in FIG. 3*a*, the adaptor 50 may comprise a first end 52 and a second end 54 having a first side 152 and a second side 154, as well as a front surface 56 and opposed first and second face surfaces 57, 58. The first side 152 on the first end 52 of the adaptor, and the second side 154 on the second end 54 of the adaptor 50 may be operatively coupled adjacent to the proximate ends 32 of the housings 30. The first side 152 and second side 154 may be at least partially open to the housings 30 of the first and second door operator assemblies 12, 14 to allow for operative coupling with the components of the door operator assemblies 12, 14. For example, the electrical wires from the motor of the first operator assembly 12 may be operatively coupled to a first control component 162, while the electrical wires from the motor of the second operator assembly 14 may be operatively coupled to a second control component 164.

It should be understood that the first face surface 57 may be a top surface or a bottom surface depending on the configuration of the adaptor 50 and/or the orientation of the adapter 50 within the door operator systems 1. The first face surface 57 may comprise one or more control components 60 (e.g., a single control component 160 and/or multiple control components). In some embodiments a single control component 160 may be located on the first face surface 57, such as for a single door operator system 16, while two control components 162, 164 may be located on the second face surface 58 (or vice versa). Consequently, the adaptor 50 may be utilized in either orientation and, in particular, may be utilized with the surface on which the single control component 160 is located facing the floor (e.g., downwardly) when the adaptor 50 is used in a single door operator system 16. Alternatively, the adaptor 50 may be utilized with the surface on which the two control components 162, 164 are located facing the floor (e.g., downwardly) when the adaptor 50 is used in a double door operator system 10. In this way, the control components 60 may be positioned on a bottom surface of the door operator system 1 (e.g., when installed) to allow users easy access to turn on or off the door operators (e.g., motors, or the like) should the need arise, such as for servicing the door operator system, keeping the door in a specific position, or the like. However, it should be understood that the adaptor 50 may comprise one or more control components 60 (e.g., single or multiple components) on a single surface of the adaptor, such as the front face 56, or the first face surface 57 or the second face surface 58. As such, it should be understood that one or more of the surfaces 56, 57, 58 may be configured to have one or more control components 60 (e.g., knockouts, or the like that allow for the installation of one or more control components 60).

The adaptor 50 may have one or more panels 62 which may be utilized in order to cover the one or more control components 60 to hide, protect, and/or prevent access to the one or more control components 60 (e.g., as illustrated by FIGS. 3*a*, 3*c*-3*d*, and 3*e*). It should be understood that the adaptor 50 (e.g., the panels and/or surfaces of the adapter 50, or the like) may include a locking member 64 (e.g., fastener, lock and key, or the like) in order to restrict access to the control components 60 or at least make it more difficult to access the control components 60 (e.g., requires unscrewing the fastener, or the like).

The first face surface 57 or the second face surface 58 may further comprise a removable portion 59 (e.g., a knockout) that allows for electrical access, if necessary, through the first or second surfaces 57, 58. For example, a knockout in the surfaces 57, 58 may be removed in order to allow access for an electrical conduit that may run along a wall and into the door operator system 1.

Figure 3G:
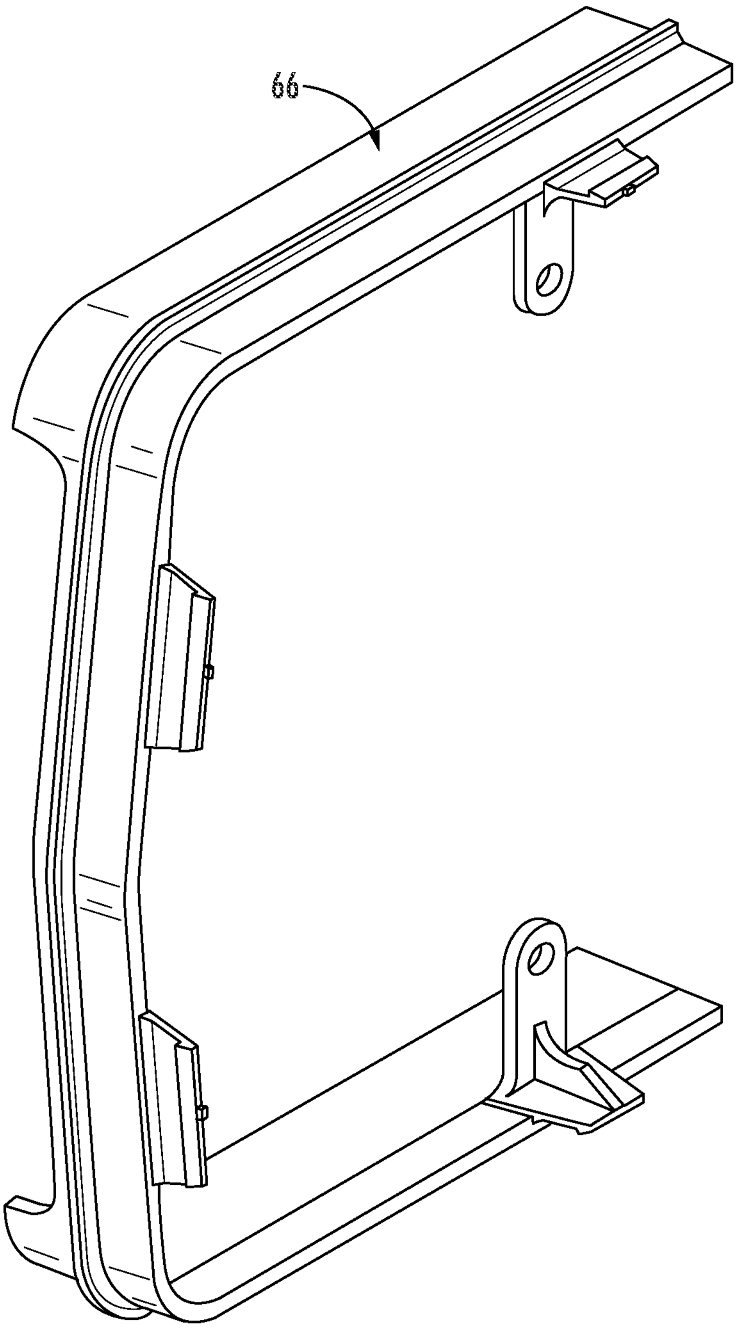
FIG. 3*g* illustrates a perspective view of a connector for the adaptor for a door operator system, in accordance with embodiments of the present disclosure.
Figure 3H:
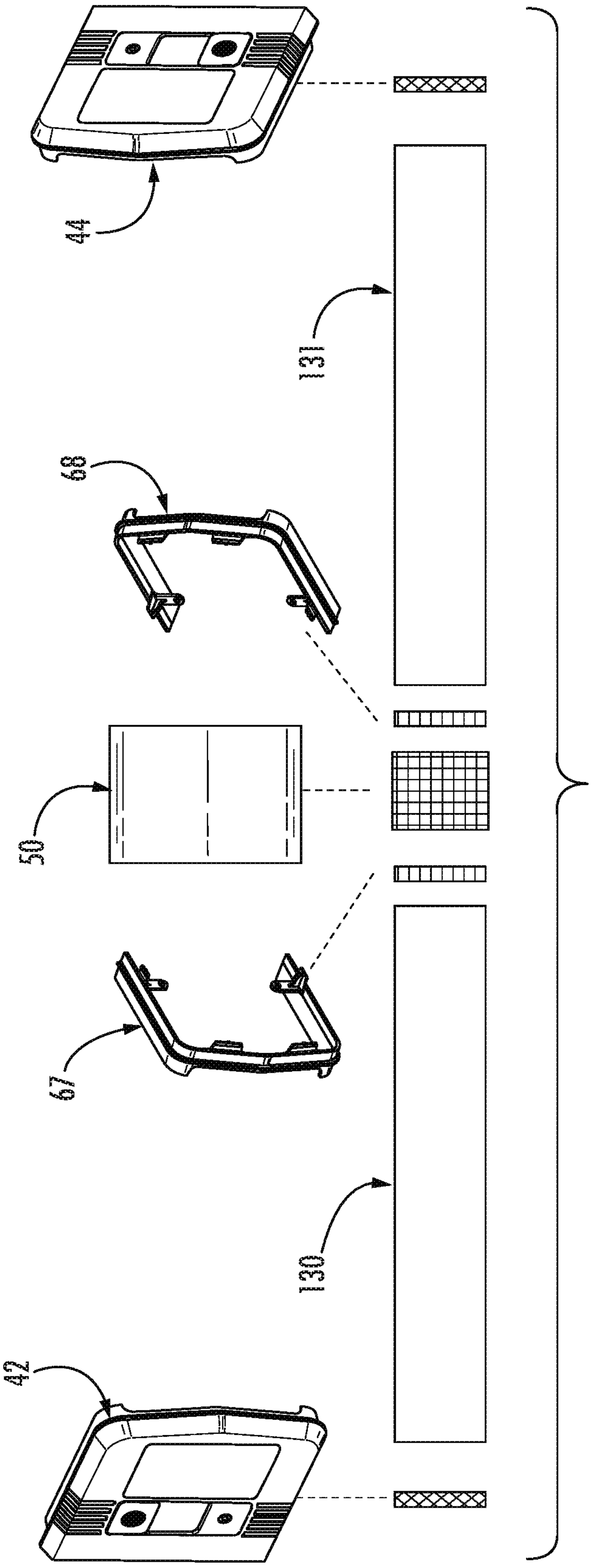
FIG. 3*h* illustrates a schematic view of a double door operator system using an adaptor, in accordance with embodiments of the present disclosure.
Figure 3I:
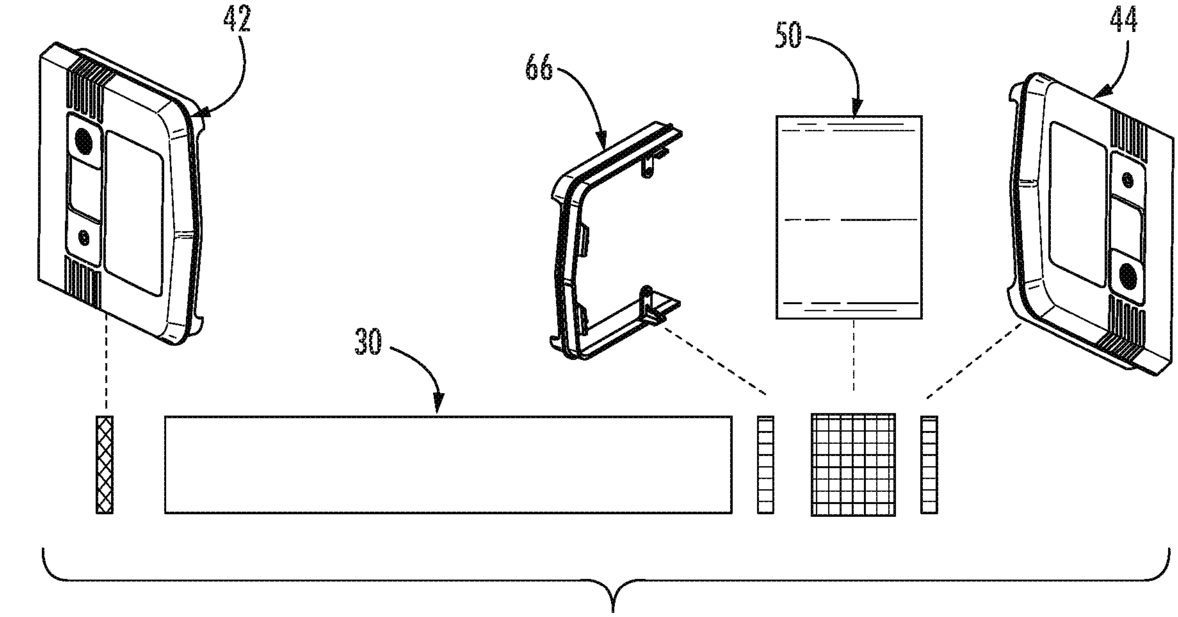
FIG. 3*i* illustrates a schematic view of a single left hand door operator system using an adaptor, in accordance with embodiments of the present disclosure.
Figure 3J:
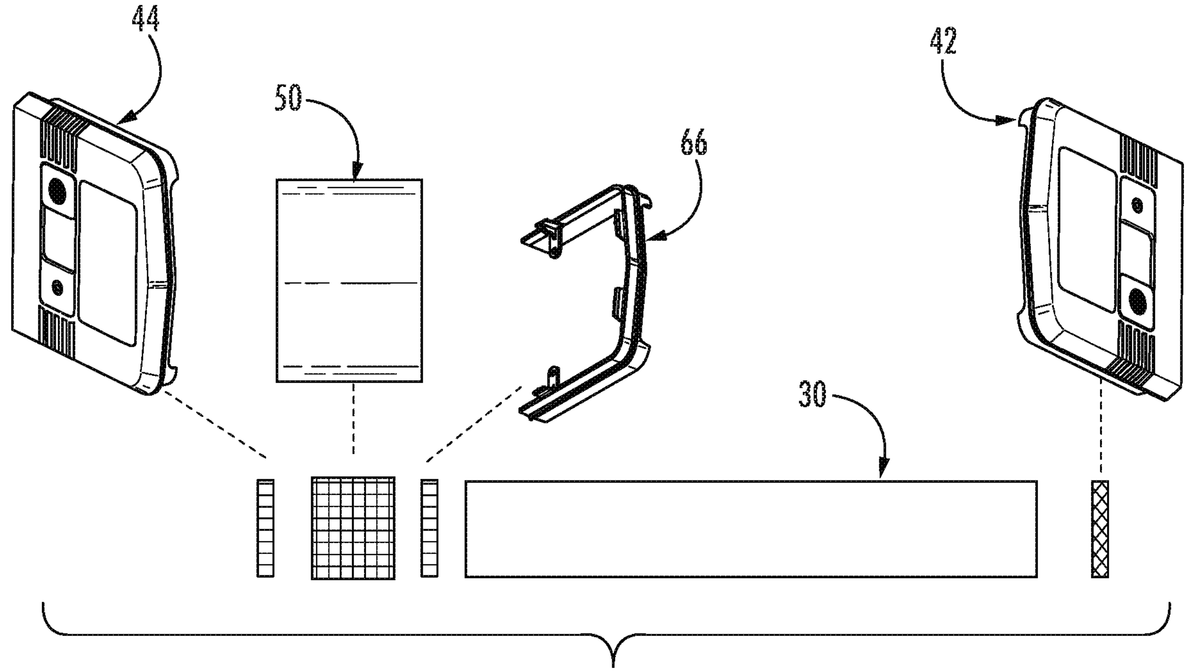
FIG. 3*j* illustrates a schematic view of a single right hand door operator system using an adaptor, in accordance with embodiments of the present disclosure.

In some embodiments of the invention the adaptor 50 may be operatively coupled directly to the housing 30 or through the use of a connector 66 (e.g., as illustrated by FIGS. 3*e* and 3*g*). The connector 66 may be removably operatively coupled to a first end 52 and/or a second end 54 of the adaptor 50 in order to allow the adaptor 50 to be installed in either orientation (e.g., for a single door operator system 16 in two different orientations), or on both ends 52, 54 (e.g., for a double door operator system 10). For example, the connector 66 may be installed on both ends 52, 54 of the adaptor 50 in order to operatively couple the adaptor 50 to adjacent proximal ends 32 of two housings 30 in a double door operator system 10. Alternatively, the connector 66 may be installed on one of the ends 52, 54 of the adaptor 50 for operative coupling adjacent an end 32 of the housing 30 in the single door operator system 16.

In the single door operator system 16, an end cap 40 is operatively coupled to a distal end 34 of the housing 30 and an end cap 40 is operatively coupled to a second end 54 of the adaptor 50. Alternatively, in the double door operator system 10 an end cap 40 may be operatively coupled to the distal ends 34 of each housing 30.

The end cap 40 may be easily removable in order to allow a user (e.g., an installer servicer, or the like) to easily access components of the door operator system 1, in order to perform maintenance (e.g., correct an electrical issue, replace a switch, adjust a biasing member within the door operator, and/or the like). Alternatively, or additionally, the end cap 40 may comprise an access aperture 46 and access cover 48 that allows a user to access the components of the door operator (e.g., as illustrated by FIG. 3*f*). The end cap 40 itself and/or the access cover 48 may have a securing feature 49 (e.g., fastener, lock and key, or the like) that restricts access to the components of the door operator system 1 or makes it more difficult to access such components. In this way, it may make it more difficult for unauthorized users to access the components of the door operator system 1. In the illustrated embodiments, the securing feature 49 may be disengaged, and the access cover 48 may be adjusted (e.g., removed, slid, swung open, or the like) in order to expose the access aperture 46.

Regardless if the end cap 40 is operatively coupled to the adaptor 50 or to an end 32, 34 of the housing 30, the access to the components (e.g. through the access aperture 46 and/or the end cap 40 itself) may allow a user to adjust the components of the door operator system 1. For example, a user may access a biasing member (e.g., spring, or the like) that allows the user to make adjustments to the door closing force and/or opening speed through adjustment of the biasing member, while the door operator 1, including the housing 30 is installed. In some embodiments, a user may be able to adjust a nut after removing the end cap 40 or the access cover 48 in order to adjust the amount of force that a spring has for operation of the door operator. In other embodiments, the user may be able to access the motor to change the speed at which the door opens and/or closes, or the like.

FIG. 3*h* illustrates the connection of components of the double door operator systems 10 in accordance with some embodiments of the invention. For example, as illustrated, the adaptor 50 may be operatively coupled to a first connector 67, which is operatively coupled to a first housing 130 at a proximate end 32 of the first housing 130, while a distal end 34 of the first housing 130 is operatively coupled to a first end cap 42. Moreover, as further illustrated in FIG. 3*h*, the adaptor 50 is also operatively coupled to a second connector 68, which is operatively coupled to a second housing 131 at a proximate end 32 of the second housing 131, while a distal end 34 of the second housing 131 is operatively coupled a second end cap 44.

FIG. 3*i* illustrates the connection of components of a single door operator system 16 configured for left hand opening. As illustrated in FIG. 3*i*, a first end 52 of the adaptor 50 may be operatively coupled to a connector 66, which is operatively coupled to a housing 30 at a proximate end 32 of the housing 30, while a distal end 34 of the housing 30 is operatively coupled to a first end cap 42. Moreover, as further illustrated in FIG. 3*i*, the second end 54 of the adaptor 50 is operatively coupled to a second end cap 44.

FIG. 3*j* illustrates the connection of components of a single door operator system 16 configured for right hand opening. As illustrated in FIG. 3*j*, a second end 54 of the adaptor 50 may be operatively coupled to a connector 66, which is operatively coupled to a housing 30 at a proximate end 32 of the housing 30, while a distal end 34 of the housing 30 is operatively to a first end cap 42. Moreover, as further illustrated in FIG. 3*i*, the first end 52 of the adaptor 50 is also operatively coupled to a second end cap 44.

FIGS. 4*a* through 4*d* illustrate a back plate assembly 100 and support member 140 for a door operator system 1. The back plate assembly 100 may have a first end 102 and a second end 104. It should be understood that in some embodiments, the back plate assembly 100 may comprise one or more detachable members, such as a first back plate 110 and a second back plate 120 (e.g., first back plate portion 110, second back plate portion 120) that are removably operatively coupled to each other. The first back plate 110 may be operatively coupled to the second back plate 120 through the use of a joint 106 (e.g., joining member, brackets, fasteners, hinges, and/or the like). The first back plate 110 and second back plate 120 may have adjacent proximate ends 112, 122 where the first back plate 110 and the second back plate 120 are operatively coupled to each other, and distal ends 114, 124 that correspond to the first end 102 and second end 104 of the back plate assembly 100. As illustrated in FIGS. 4*a* through 4*e*, the adjacent proximate ends 112, 122 may have a joint 106 comprising one or more projections (e.g., fingers 116, 126), and one or more recessions (e.g., finger apertures 118, 128). The first back plate 110 and/or the second back plate 120 may comprise one, two, three, four or the like fingers 116, 126 and one, two, three, four or the like finger apertures 118, 128. In some embodiments of the invention, the fingers 116, 126 of the first back plate 110 and/or the second back plate 120, may be coupled within the finger apertures 118, 128 of the first back plate 110 and/or the second back plate 120. For example, as illustrated in FIGS. 4*a* through 4*d* the fingers 116, 126 may be round and the finger apertures 126,128 may also be round for mating with the fingers 116, 126. In other embodiments, the fingers 116, 126 and the finger apertures 118, 128 may be any type of shape, such as triangular, oval, square, rectangular, trapezoidal, any polygonal, non-uniform, and/or the like. For example, as illustrated in FIG. 4*e*, the fingers 116, 126 and the one or more finger apertures 118, 128 may be trapezoidal shaped.

Moreover, while the fingers 116, 126 and the finger apertures 118, 128 are illustrated as being on each of the adjacent proximate ends 112, 122 of the first back plate 110 and the second back plate 120, it should be understood that that the fingers 116 may be on one end of a back plate while the finger apertures 128 may be on an end the adjacent back plate. Moreover, while the figures illustrate that there may be multiple fingers 116, 126 and finger apertures 118, 128, it should be understood that there may one be one finger 116, 126 and one finger aperture 118, 128.

In some embodiments of the invention the joint 106 of the back plate assembly 100 may operatively couple the first back plate 110 to the second back plate 120 to allow the first back plate 110 to move with respect to the second back plate 120. For example, the joint 106 (e.g., hinge, or the like) may allow the first back plate 110 and/or the second back plate 120 to rotate with respect to each other. For example, the first back plate 110 may be folded back upon the second back plate 120, which allows for improved shipping, assembly, and/or the like, as will be described herein.

As illustrated in FIGS. 4*a* through 4*d*, a support member 140 (e.g., bracket, or the like) may be operatively coupled to, or otherwise form a part of, the back plate assembly 100. As such, the support member 140 may be operatively coupled to the first back plate 110 and/or the second back plate 120 of the back plate assembly 100. The support member 140 may comprise one or more flanges 142 operatively coupled by one or more connecting members 144 (e.g., integrally formed, formed separately and coupled together, and/or the like). For example, the support member 140 may have one or more back plate flanges 145, one or more offset flanges 146 that are operatively coupled to the back plate flanges 145 by one or more connecting members 144. The support member 140 may provide structural support to the back plate assembly 100, in particular, at the joint 106 between the first back plate 110 and second back plate 120 of the back plate assembly 100. That is, the one or more flanges 142 of the support member 140 may span the joint 106 between the back plates 110, 120 such that should the mounting surface (e.g., wall, frame, or the like) be put under stress (e.g., become warped, or the like), then the joint 106 in the back plate assembly 100 has additional support to avoid damage to the double door operator system 10 and/or the components thereof.

The support member 140 may also provide a location for the connection of the electrical components of the double door operator system 10. In some embodiments, the support member 140 may include a system control (e.g., input power switch, or the like) that is operatively coupled to the input power from the building. The system control may be utilized to control the power to the entire double door operator system 10. The system control may be in addition to the adaptor 50 having the individual door operators control components 60. In some embodiments the system control may be located within the support bracket 140, such as within a control aperture 148 in the support bracket 140.

The back plate assembly 100 may further comprise one or more mounting components 108. The mounting components 108 may comprise any type of mounting feature, such as tabs, slots, hooks, projections, embossments, and/or the like.

Figure 4A:
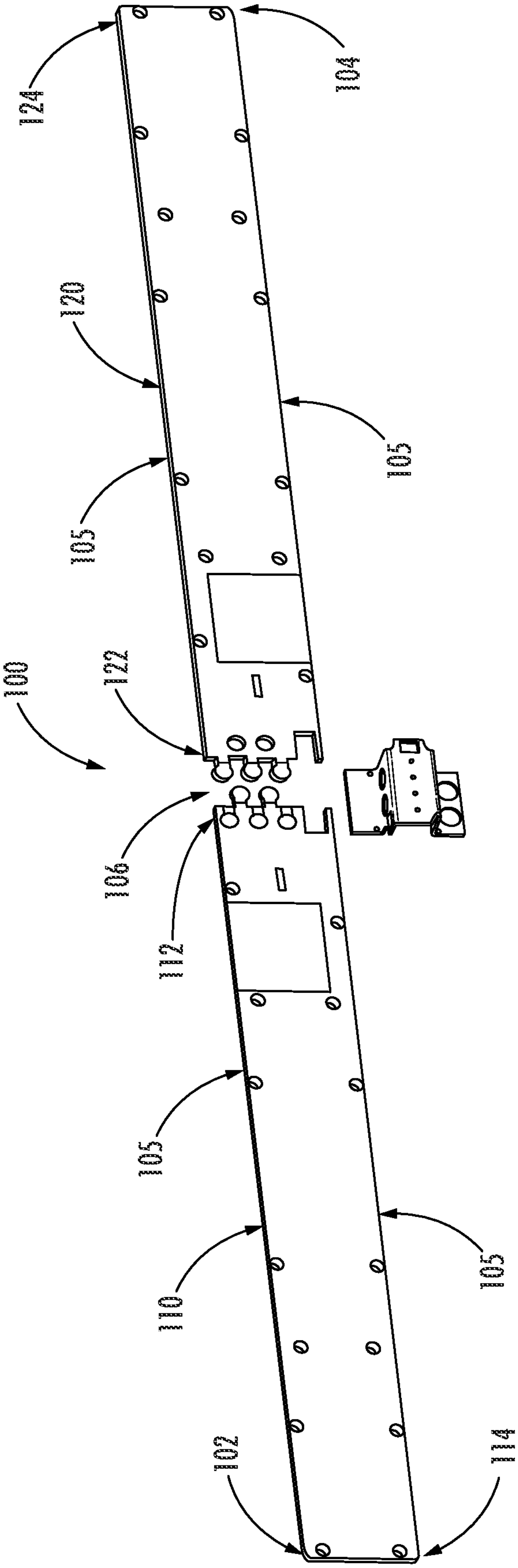
FIG. 4*a* illustrates a perspective view of an unassembled back plate assembly and a support member for a door operator system, in accordance with embodiments of the present disclosure.
Figure 4B:
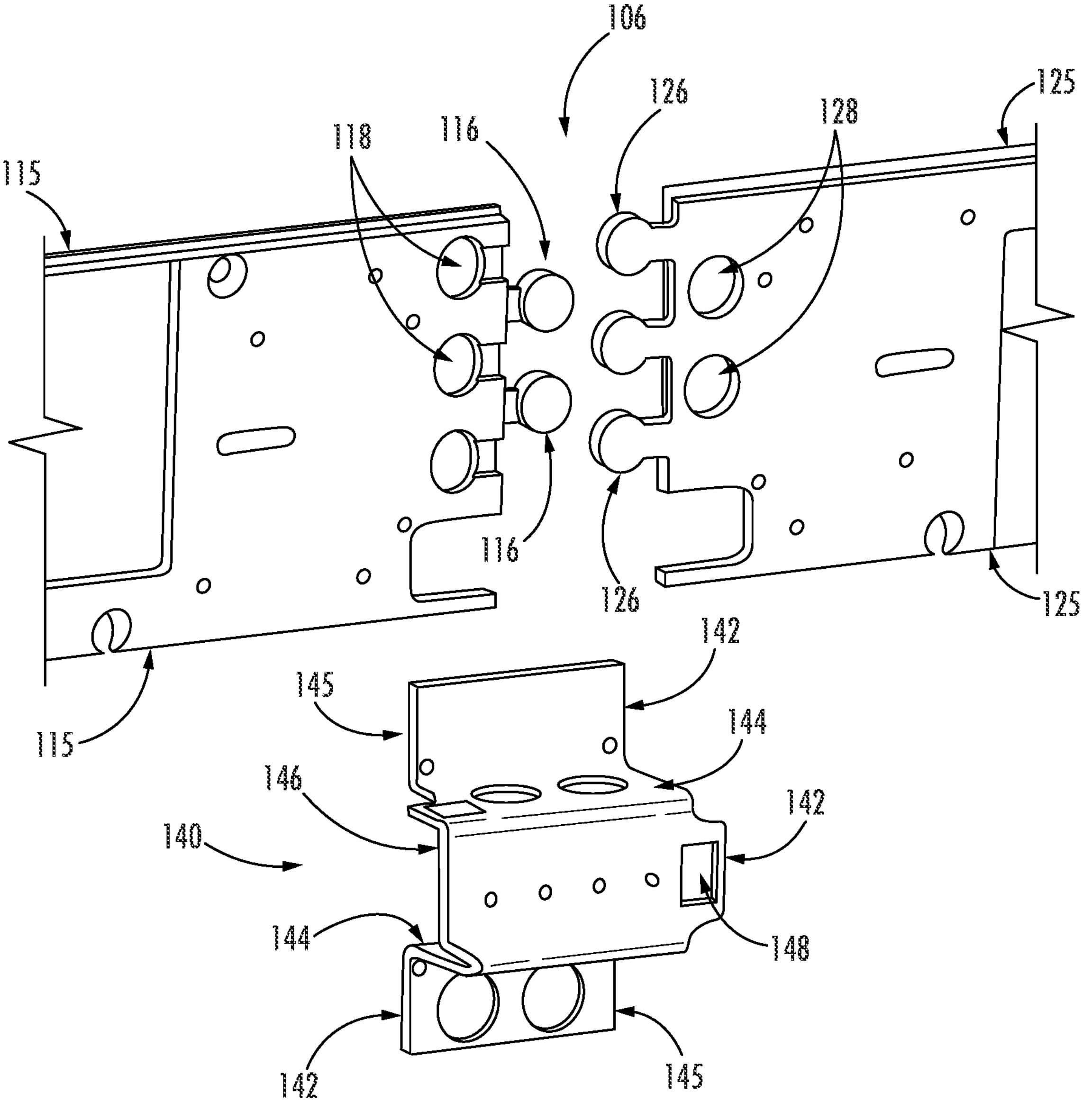
FIG. 4*b* illustrates an enlarged perspective view of an unassembled back plate assembly and a support member for a door operator system, in accordance with embodiments of the present disclosure.
Figure 4C:
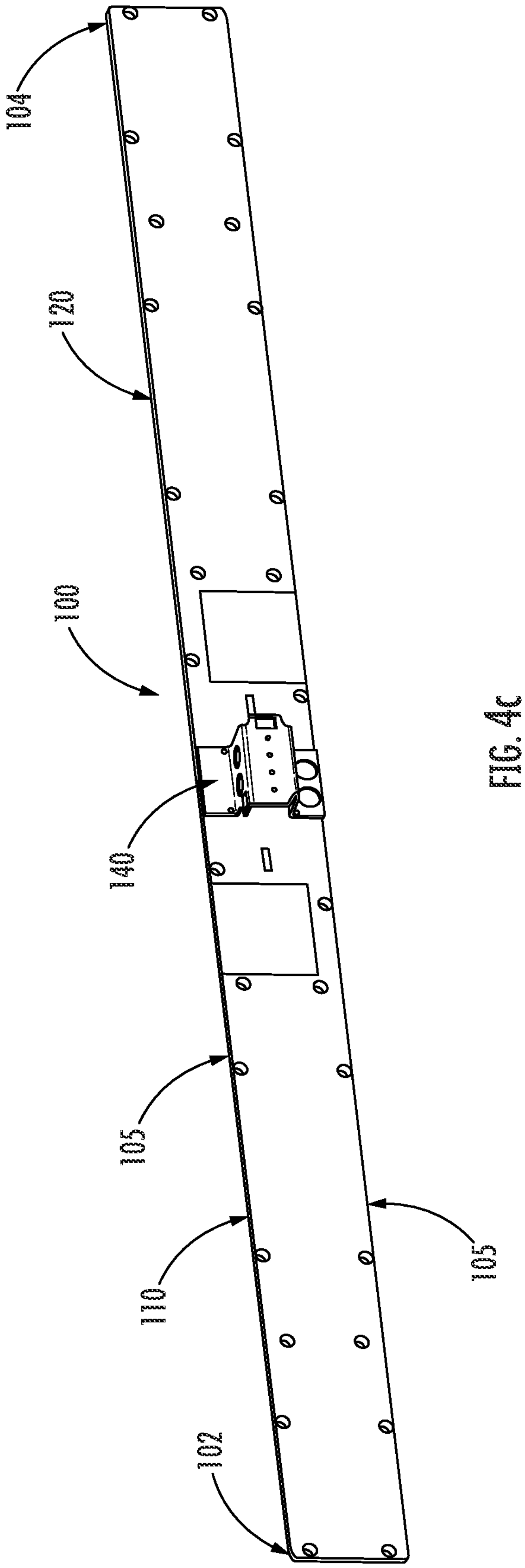
FIG. 4*c* illustrates a perspective view of a back plate assembly for a door operator system, in accordance with embodiments of the present disclosure.
Figure 4D:
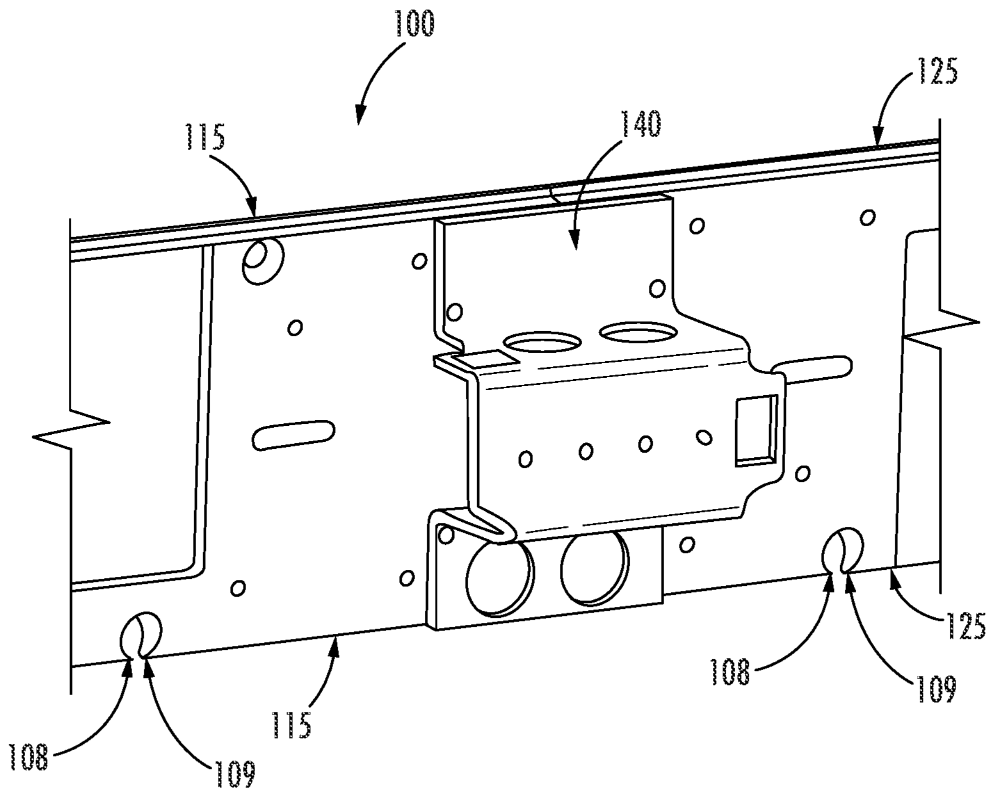
FIG. 4*d* illustrates an enlarged perspective view of a back plate assembly for a door operator system, in accordance with embodiments of the present disclosure.
Figure 4E:
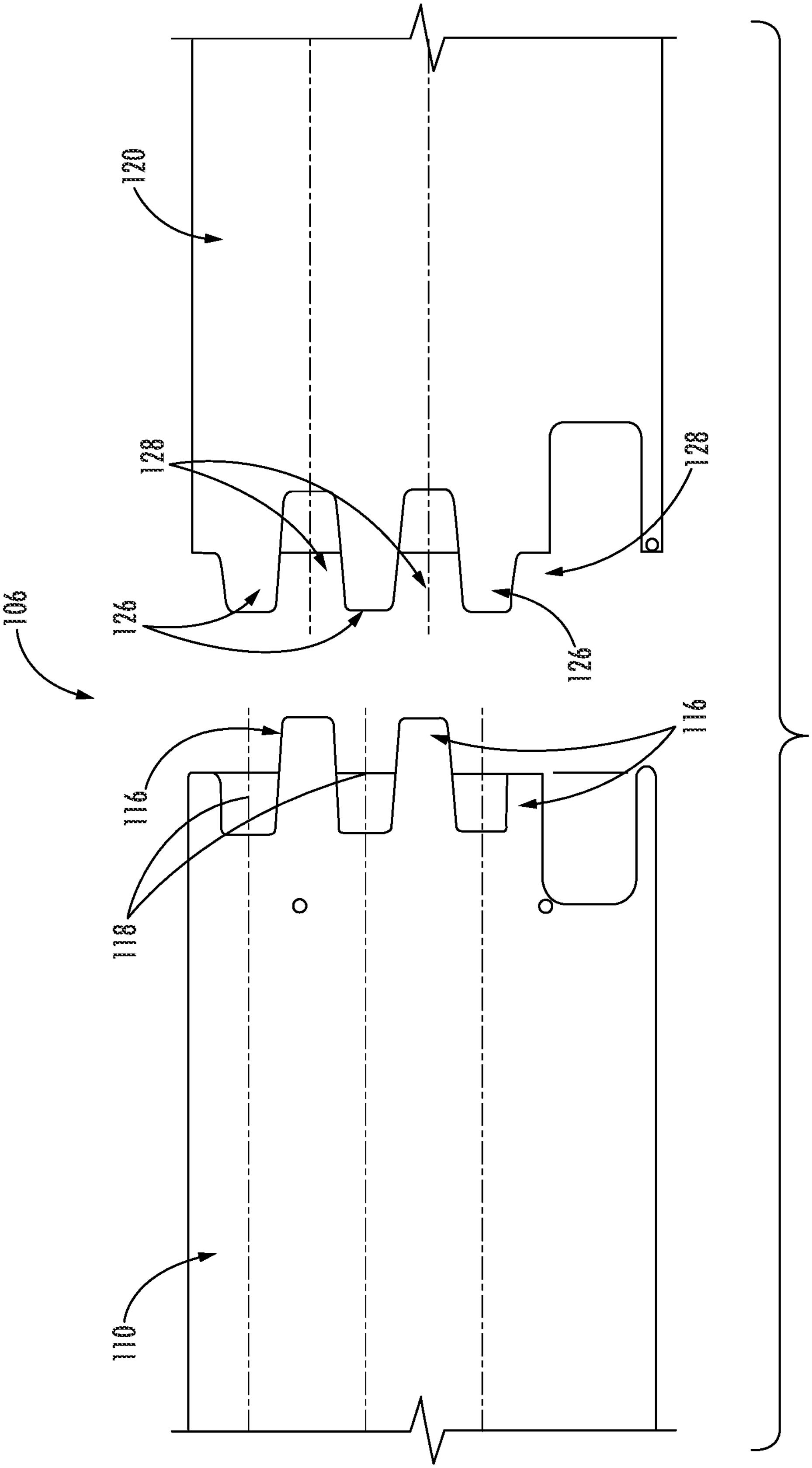
FIG. 4*e* illustrates a front view of an unassembled back plate assembly, in accordance with embodiments of the present disclosure.
Figure 4F:
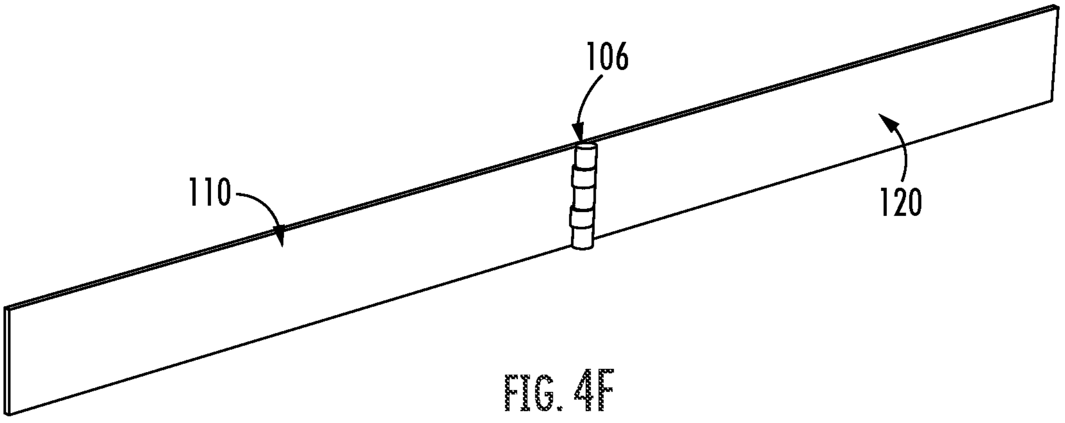
FIG. 4*f* illustrates a perspective view of a back plate assembly, in accordance with embodiments of the present disclosure.
Figure 4G:
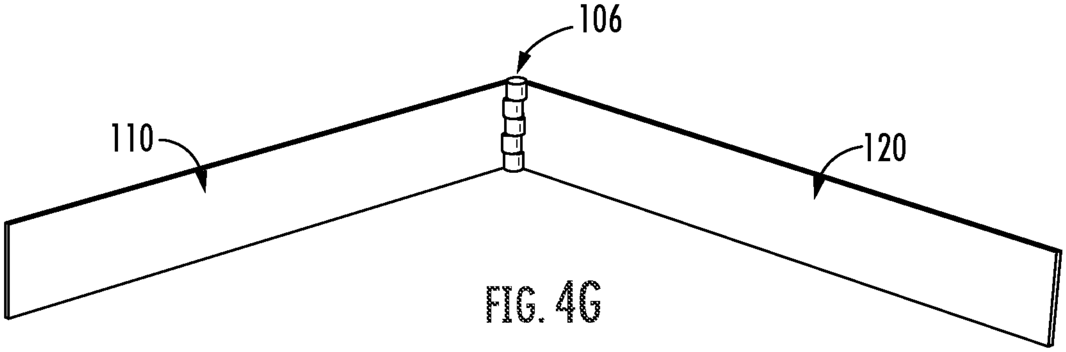
FIG. 4*g* illustrates a perspective view of a back plate assembly, in accordance with embodiment of the present disclosure.
Figure 4H:
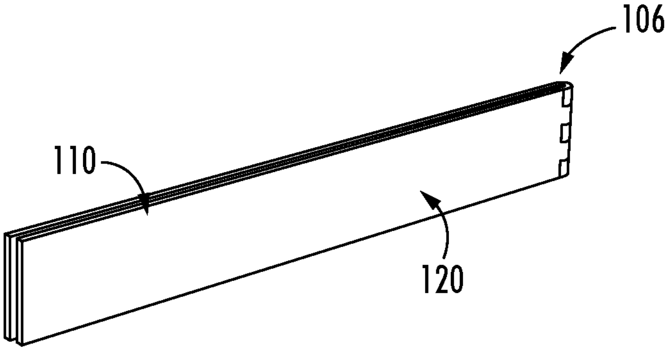
FIG. 4*h* illustrates a perspective view of a back plate assembly, in accordance with embodiments of the present disclosure.

As illustrated in FIG. 4*d*, the one or more mounting components 108 may comprise one or more apertures 109, such as one or more slotted holes. As will be described in further detail with respect to FIG. 9, the one or more slotted apertures may allow an installer to operatively couple fasteners into a mounting surface (e.g., a wall, door frame, door, and/or the like), and thereafter, the back plate assembly 100, such as the first back plate 110 and/or the second back plate 120 may be operatively coupled to the fasteners.

Figures 7A, 7B:
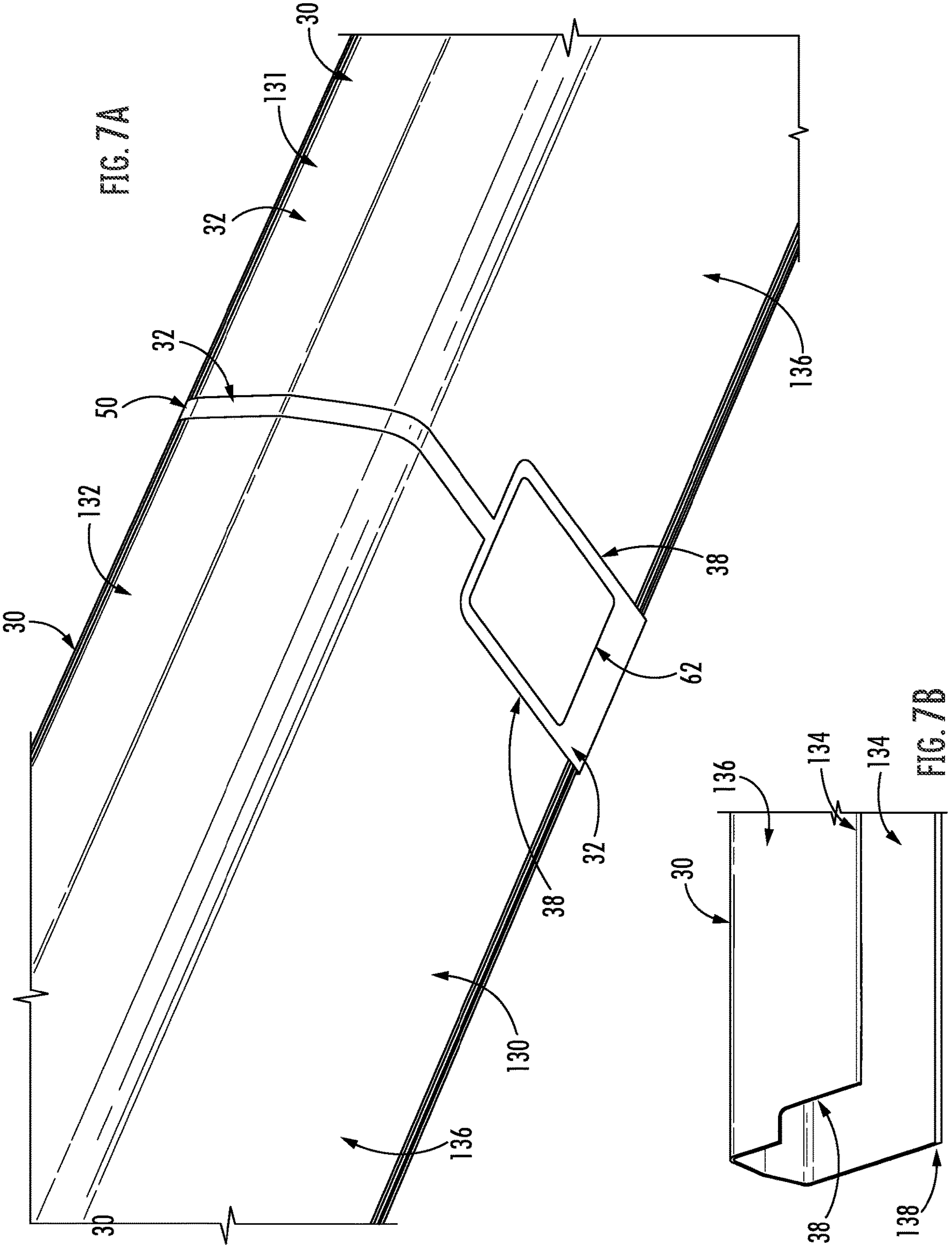
FIG. 7*a* illustrates a perspective view of a double door operator system with an adapter, in accordance with embodiments of the present disclosure.
FIG. 7*b* illustrates a perspective view of a housing end for use with the adapter illustrated in FIG. 7*a*, in accordance with embodiments of the present disclosure.

Moreover, as will be described with respect to FIG. 9, the back plate assembly 100 (or the two or more portions thereof, such as the two or more back plates) may comprise one or more housing connectors 105. The one or more housing connectors may comprise one or more first housing connectors 115 and/or one or more second housing connectors 125. As illustrated in FIGS. 4*a* through 4*d*, the one or more housing connectors 105 may comprise a groove that extends at least partially along the length of one or more edges the back plate assembly 100 (e.g., upper and lower edges of the back plate assembly 100). It should be further understood that the housing 30 may comprise a front surface 132 and two face surfaces 134, 136 (e.g., an upper surface 134 and a lower surface 136 depending on the orientation) that extend from the front surface 132. As such, the housing 30 may be a generally c-shaped housing; however, it should be understood that the housing 30 may be any type of shape. The housing 30, such as the edges of the two face surfaces 134, 136 may further comprise one or more housing lips 138 (e.g., as illustrated in FIG. 7*b*). The one or more housing lips 138 may extend at least partially along the edges of face surfaces 134, 136 of the housing 30. As such, the back plate assembly 100 allows the housings 30 to snap into the back plate assembly 100, by snapping the one or more housing lip(s) 138 into the one or more groove(s) 105 of the back plate assembly 100. It should be understood that in some embodiments the two face surfaces 134, 136 may be biased to provide a spring fit between the housings 30 and the back plate assembly 100. For example, the two face surfaces 134, 136 may diverge (or have portions that diverge) from the front surface 132 towards the open portion of the housings 30.

Figure 5:
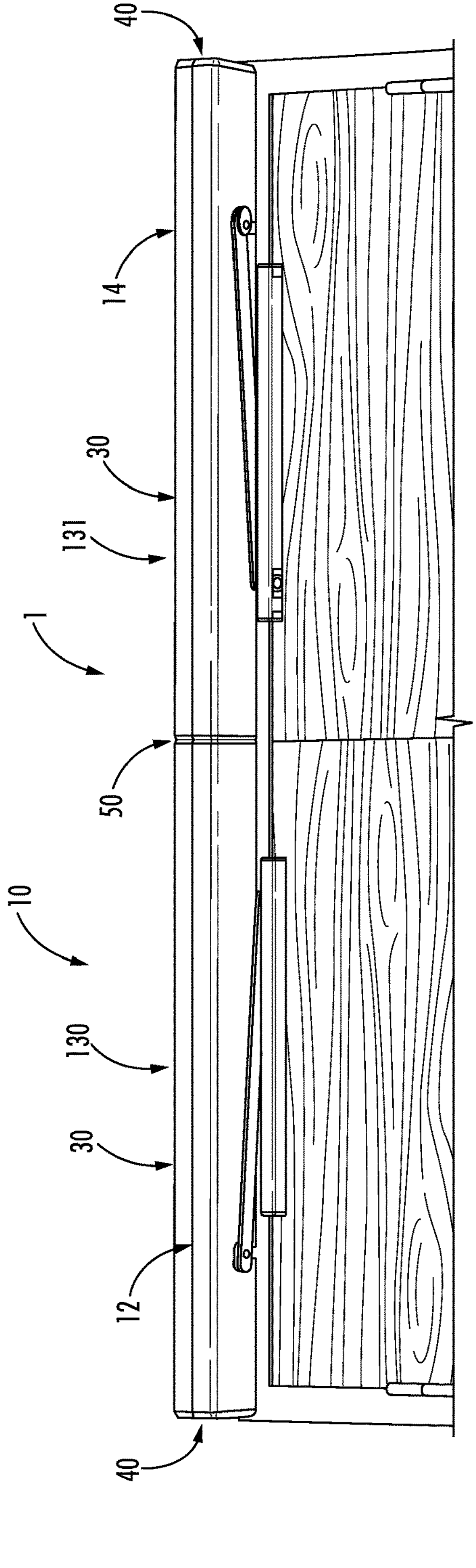
FIG. 5 illustrates a perspective view of a double door operator system installed on a double door, in accordance with embodiments of the present disclosure.

FIG. 5 illustrates a perspective view of a double door operator system 10 installed on a double door, in accordance with some embodiments of the present disclosure. As illustrated in FIG. 5, in some embodiments the adaptor 50 may be a member that is used to operatively couple the first housing 130 to the second housing 131 without including other components, such as the control components 60, in the adaptor 50. For example, the adapter 50 may omit the control components 60 of the double door operator system 10 (e.g., the control components may be located on one or more end caps 40 in the embodiment illustrated in FIG. 5, in the housings 30, and/or the like).

Figures 6A, 6B:
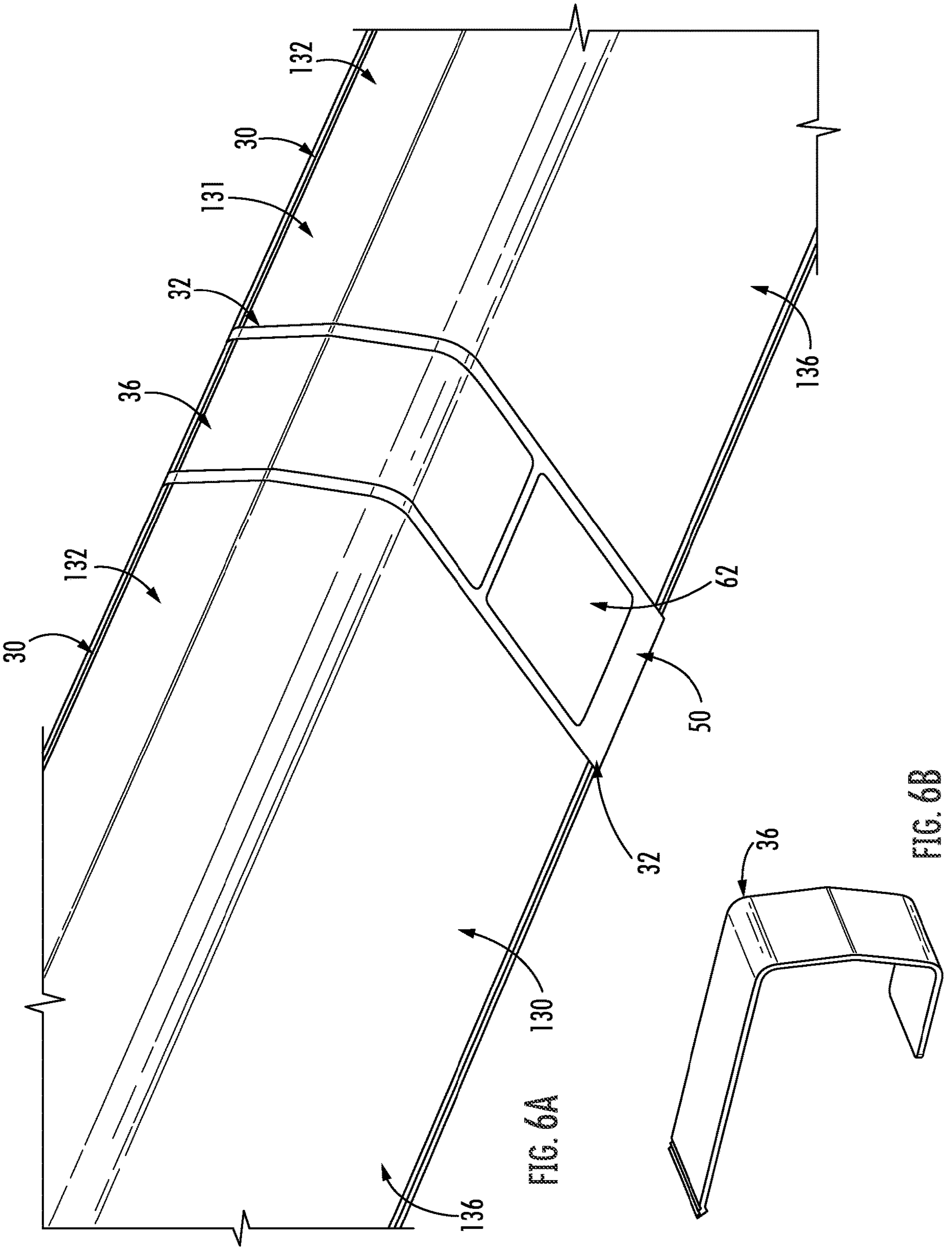
FIG. 6*a* illustrates a perspective view of a double door operator system with an adapter, in accordance with embodiments of the present disclosure.
FIG. 6*b* illustrates a perspective view of an adapter insert for double door operator system, in accordance with embodiments of the present disclosure.

FIGS. 6*a* and 6*b* illustrate a perspective view of a double door operator system 10, comprising an adaptor 50 that operatively couples the first housing 130 and the second housing 131. Moreover, as illustrated in FIGS. 6*a* and 6*b*, the double door operator system 10 comprises a housing insert 36 that is operatively coupled to the first housing 130 the second housing 131 and/or the adaptor 50. For example, the housing insert 36, as illustrated in FIG. 6*b* may be operatively coupled to the housing 30 separate from the adaptor 50. That is, in some embodiments the housing insert 36 may be removable such that a user (e.g., installer, repairer, or the like) may be able to access at least a portion of the components within the double door operator system 10. Consequently, a user may be able to remove the insert 36 in order to access components within the adaptor 50, or within the housings 30, without having to remove the adaptor 50, housings 30, and/or the end caps 40 (or a portion of the end caps).

FIG. 7*a* illustrates a perspective view of the double door operator system 10, comprising the adaptor 50 that operatively couples the first housing 130 and the second housing 131. Moreover, as illustrated in FIGS. 7*a* and 7*b*, the double door operator system 10 comprises housings 30 that have adaptor apertures 38, which are configured to receive at least a portion of the adaptor 50. It should be understood that as illustrated in FIG. 7*a*, the adaptor 50 may have different widths, such as control component width and a union width. As such, the adaptor apertures 38 in the housing 30 allow for securing the wider control component width of the adaptor 50, including the control components 60 that are used for controlling the power to the operator assemblies 12, 14 of double door operator system 10.

Figures 8A, 8B:
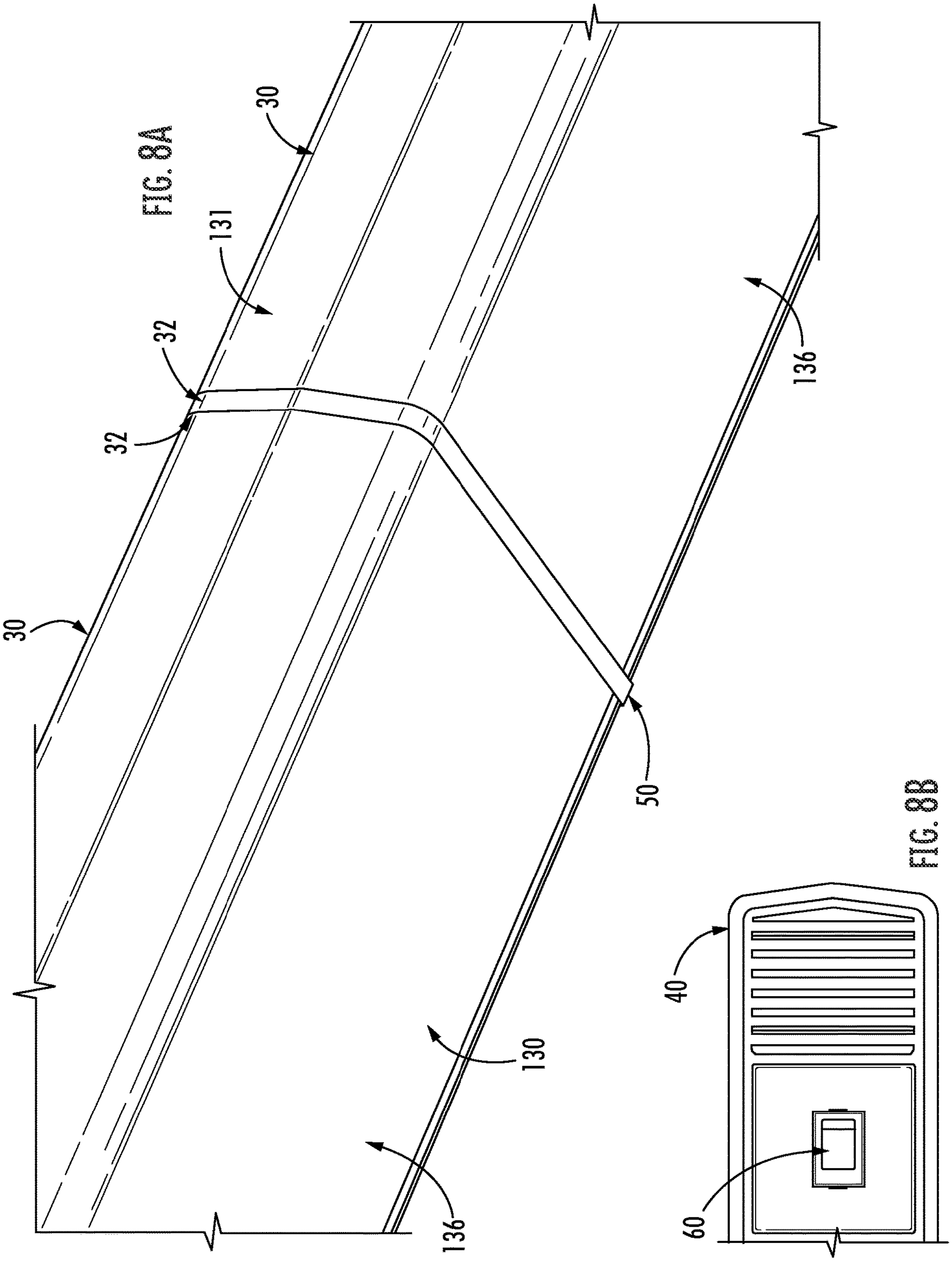
FIG. 8*a* illustrates a perspective view of a double door operator system with an adapter, in accordance with embodiments of the present disclosure.
FIG. 8*b* illustrates a side view of an end cap with an activation control for use with the double door operator system illustrated in FIG. 8*a*, in accordance with embodiments of the present disclosure.

FIG. 8*a* illustrates a perspective view of the double door operator system 10, comprising the adaptor 50 that operatively couples the first housing 130 and the second housing 131. Moreover, as illustrated in FIGS. 8*a* and 8*b*, the double door operator system 10 comprises the components described herein that allow for operatively coupling to the first housing 130 and the second housing 131 without including the control components 60 in the adaptor 50. In these embodiments, the control components 60 may be provided directly through the housings 130, 131, and/or through end caps 40, as is illustrated in FIG. 8*b*.

Figure 9:
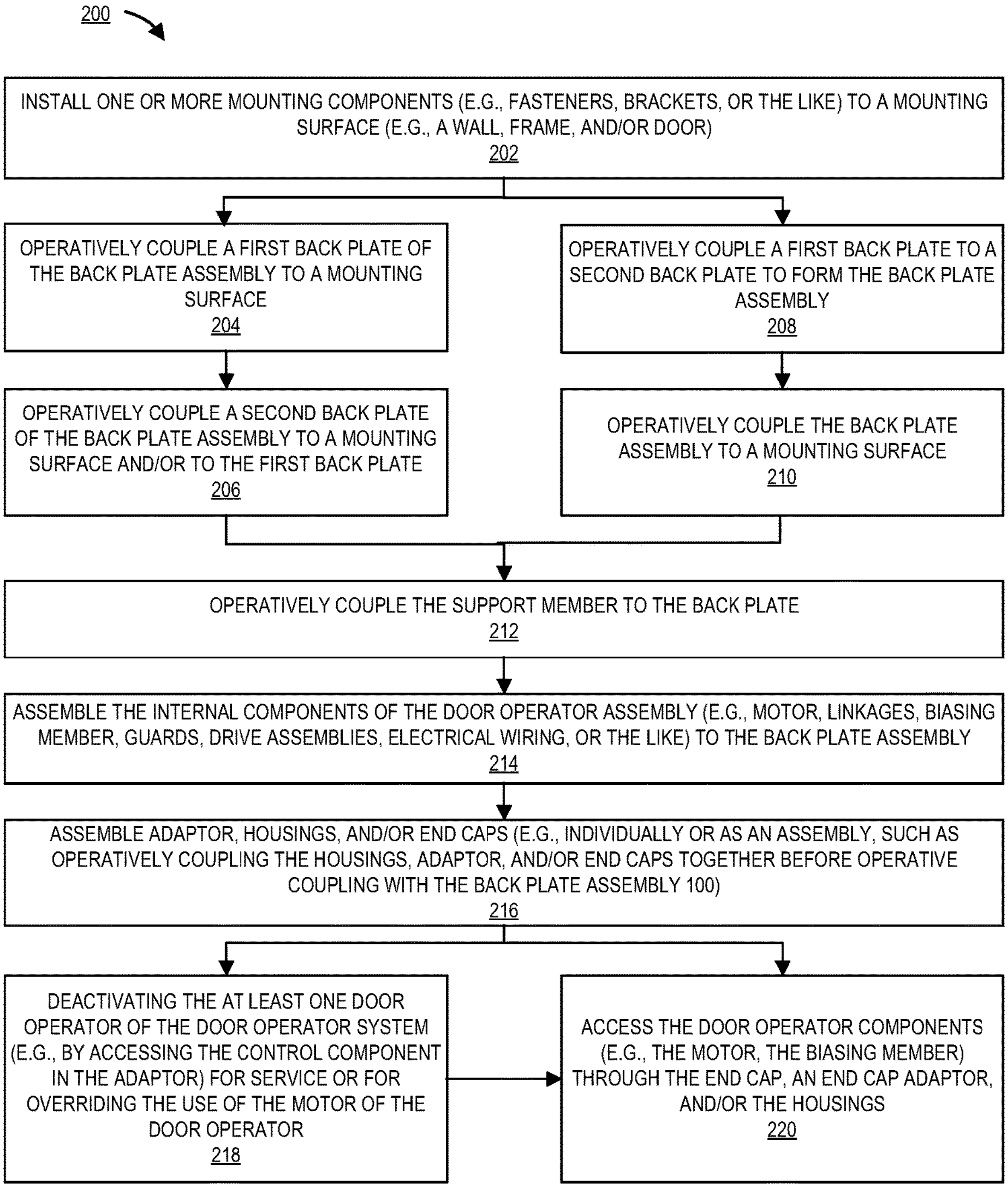
FIG. 9 illustrates a process flow 200 for installing a double door operator system, in accordance with some embodiments of the present disclosure.

FIG. 9 illustrates a process for installing the double door operator system 10 described herein. As illustrated by block 202 of FIG. 9, an installer may install one or more mounting components to a surface. The one or more mounting components may be any feature that is utilized to aid in mounting a back plate (e.g., standard single back plate, disassembled back plate as illustrated herein, or the like). For example, the mounting components may comprise fasteners, such as screws, pins, rivets, or the like, hangers, brackets, or combinations of these mounting components that can be operatively coupled to a mounting surface. The surface may by any surface adjacent a door opening, such as a wall, ceiling, door frame, door, and/or the like that may be used to support the back plate assembly 100, while the back plate assembly 100 is operatively coupled to the mounting surface (e.g., other fasteners or mounting components can be used to secure the back plate(s) as the mounting components hold the back plate(s) in place).

Blocks 204 and 206 illustrate that a first back plate 110 and a second back plate 120 may be operatively coupled to a mounting surface separately. Alternatively, as illustrated by blocks 208 and 210, the first back plate 110 and the second back plate 120 may be operatively coupled together (e.g., with or without the support member 140) before the back plate assembly 100 is operatively coupled to the mounting surface. The ability to install multiple components (e.g., separate back plate portions) separately may provide the ability for multiple installers to install separate components of the double door operator systems 10 at the same. Alternatively, being able to assemble the back plate assembly 10 (e.g., the separate back plate portions) together before installation on a mounting surface may allow a single installer to more effectively and accurately install the double door operator system 10.

FIG. 9 further illustrates in block 212 that the support member 140 may be operatively coupled to the back plate assembly 100, if it was not already pre-assembled by an installer before the back plate assembly 100 was operatively coupled to the mounting surface.

Block 214 of FIG. 9 further illustrates that the internal components of the double door operator system 10 may be operatively coupled to the back plate assembly 100. For example, the internal components may include, but are not limited to, the motor(s), linkage(s), biasing member(s), component guard(s), drive assemblies, electrical components, electrical wiring, or the like. It should be understood that in some embodiments the location of the components and/or installation instructions may be directly incorporated into the back plate assembly 100. For example, locations of components and/or instructions for assembling may be etched into the back plate assembly 100 itself (e.g., laser etched, or the like).

Block 216 of FIG. 9 further illustrates that the housing(s) 30, adaptor 50, and/or the end caps 40 may be operatively coupled to the back plate assembly 100, individually or as pre-assembled components (e.g., housings 30 including the adaptor 50 and an end cap 40 may be pre-assembled and operatively coupled to the back plate assembly 100 at the same time). Once assembly of these components are completed, the double door operator system 10 may be activated (e.g., system power and/or individual operator power switches may be turned on).

FIG. 9 further illustrates that in block 218, in some embodiments at least one of the control components 60 and/or the system control may be deactivated by deactivating the control components (e.g., turning off the switch). The door associated with the deactivated control component 60 may then be opened or closed manually. Alternatively, the individual door operator assemblies 12, 14 of the double door operator system 10 may be deactivated in order to allow for service of the double door operator system 10 (or the components thereof).

Block 220 of FIG. 9 further illustrates that the door operator components may be accessed through the one or more end caps 40. That is, as discussed herein the one or more end caps 40 may be removable, or a portion thereof may be moved to expose and end cap aperture 48 that allows a user to access internal components, such as but not limited to the biasing member. As such, a user may be able to access the biasing member in order to adjust the force of the biasing member. For example, the force may be adjusted in order to adjust the speed at which the motor opens the door and/or the speed at which the door may close. Alternatively, other components may be accessed through the end cap 40 and/or end cap aperture 48 in order to service and/or adjust the internal components thereof. While the end cap 40, or an end cap 40 aperture thereof, is described as providing the access to the internal components of the double door operator systems 10, it should be understood that access may be provided in the same or similar way through an access point anywhere in the housings 30 and/or adaptor 50.

The embodiments of the invention described herein provide improvements over current door operator systems. For example, the use of the housings 30, end caps 40, and/or adaptors 50 on both single door operator systems 16 and double door operator system 10 improves manufacturing and interchangeability of the components of the door operator systems 1. That is, the components may be manufactured and used for single door operator systems 16 or double door operator systems 10 on an as needed basis. Moreover, the same components provide more flexibility for customers in redesigning and/or replacing components. For example, customers may be able to change door operator systems 1 based on renovations, swapping out damaged components, or the like because the housings 30, end caps 40, and/or adaptors 50 are common components across single and double door operator systems 1. Furthermore, shipping size of the double door operator systems 10 are improved because the door operator components, such as the housings 30 and/or the back plate assemblies 100 may be broken down into smaller components as opposed to these components being integral one piece components that could span 4, 5, 6, 7, 8, 9, or the like feet. Furthermore, as previously described above, the door operator systems 1 and components thereof provide improved installation and service options that allow a single user to install, service, or control the door operator systems 1. As such, the present invention is more cost efficient due to the improved manufacturing, shipping, installation, or the like improvements of the present invention.

Furthermore, the adaptor 50 that includes the one or more control components 60 provides the ability to properly locate the controls for the door operator system 1. For example, with respect to the double door, the adaptor 50 having the controls components 60 in a single location (e.g., facing the floor, or the like) allows a user to easily access and identify the controls for each door operator assembly (e.g., the left switch operates the left door operator, while the right switch operates the right door operator). Moreover, the control components in the double door operator system 10 are located away from the ends of the double door operator system 10, while in the single door operator systems 16 the adaptor 50 may be placed on either end of the housing 30. In this way, the control components 60 may be located away from an end of the door operator system 1 near a wall or other obstruction that would make is difficult for a user to access and activate and/or deactivate the door operator system 1.

It will be understood that, where possible, any of the advantages, features, functions, devices, and/or operational aspects of any of the embodiments of the present disclosure described and/or contemplated herein may be included in any of the other embodiments of the present disclosure described and/or contemplated herein, and/or vice versa.

Where possible, any terms expressed in the singular form herein are meant to also include the plural form and/or vice versa, unless explicitly stated otherwise. Accordingly, the terms "a" and/or "an" shall mean "one or more." Moreover, it should be understood that "operatively coupled" (or other similar nomenclature), when used herein, means that the components may be formed integrally with each other, or may be formed separately and coupled together. Furthermore, "operatively coupled" means that the components may be coupled directly to each other, or to each other with one or more components located between the components that are operatively coupled together. Furthermore, "operatively coupled" may mean that the components are detachable from each other, or that they are permanently coupled together.

Furthermore, certain terminology is used herein for convenience only and is not to be taken as a limiting, unless such terminology is specifically described herein for specific embodiments. Indeed, the components may be oriented in any direction and the terminology, therefore, should be understood as encompassing such variations unless specified otherwise. The terminology includes the words specifically mentioned herein, derivatives thereof and words of similar import. For example, words such as "upper", "lower", "top", "bottom", "side", "left", "right", are used simply to describe the orientation of certain features illustrated in the figures.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An adaptor configured to be used with a single door operator system that opens or closes a single swinging door or with a double door operator system that opens or closes a first swinging door and a second swinging door, the adaptor comprising:
- a first face surface;
- a second face surface;
- a front face surface operatively coupling the first face surface and the second face surface; and
- one or more control components operatively coupled to one or more of the first face surface, the second face surface, or the front face surface, wherein the one or more control components are configured to activate or deactivate one or more operator assemblies;
- wherein the adaptor is configured to be operatively coupled to either end of a single door housing and an end cap of the single door operator system or configured to be operatively coupled between a first housing of a first operator assembly and a second housing of a second operator assembly of the double door operator system to join the first operator assembly and the second operator assembly; and
- wherein the first face surface, the second face surface, or the front face surface having the one or more control components is accessible when the adaptor is operatively coupled to the single door operator housing or the first housing and second housing of double door operator system.

2. The adaptor of claim 1, further comprising:
- a connector for operatively coupling the adaptor to the single door housing for the single door operation system;
- wherein when the adaptor is used in the single door operator system, the adaptor is operatively coupled to the single door operator system, the adaptor is operatively coupled to a first end of a single door operator assembly at a first adaptor end using the connector and the end cap is operatively coupled at a second adaptor end.

3. The adaptor of claim 1, further comprising:
- a first connector for operatively coupling the first housing to a first adaptor side of the adaptor; and
- a second connector for operatively coupling the second housing to a second adaptor side of the adaptor;
- wherein when the adaptor is used in the double door operator system, the adaptor is operatively coupled to the first housing of the first operator assembly through the first connector and to the second housing of the second operator assembly through the second connector.

4. The adaptor of claim 1, wherein the one or more control components of the adaptor comprise:
- a single control component configured to activate or deactivate the single door operator system when used within the single door operator system; or
- a first control component configured to activate or deactivate the first operator assembly and a second control component configured to activate or deactivate the second operator assembly when used within the double door operator system.

5. The adaptor of claim 1, wherein the adaptor is used with the single door operator system that opens or closes the single swinging door.

6. The adaptor of claim 1, wherein the adaptor is used with the double door operator system that opens or closes the first swinging door and the second swinging door.

7. The adaptor of claim 1, wherein the one or more one or more control components comprises a switch, button, toggle, or lever.

8. The adaptor of claim 1, wherein the end cap allows for spring adjustment of a spring with the end cap installed to the adaptor.

9. The adaptor of claim 1, wherein the adaptor further comprises:
- one or more panels for providing access and coverage over the one or more control components.

10. The adaptor of claim 9, wherein the adaptor further comprises:
- one or more locking members for locking or unlocking the one or more panels.

11. An adaptor configured to be used with a single door operator system that opens or closes a single swinging door, the adaptor comprising:
- a first face surface;
- a second face surface;
- a front face surface operatively coupling the first face surface and the second face surface; and
- one or more control components operatively coupled to one or more of the first face surface, the second face surface, or the front face surface, wherein the one or more control components are configured to activate or deactivate one or more operator assemblies;
- wherein the adaptor is configured to be operatively coupled adjacent to either end of a single door housing and an end cap of the single door operator system; and
- wherein the first face surface, the second face surface, or the front face surface having the one or more control components is accessible when the adaptor is operatively coupled to the single door operator housing.

12. The adaptor of claim 11, further comprising:
- a connector for operatively coupling the adaptor to the single door housing for the single door operation system;
- wherein when the adaptor is operatively coupled to the single door operator system, the adaptor is operatively coupled to a first end of a single door operator assembly at a first adaptor end using the connector and the end cap is operatively coupled at a second adaptor end.

13. The adaptor of claim 11, wherein the one or more control components of the adaptor comprise:
- a single control component configured to activate or deactivate the single door operator system.

14. The adaptor of claim 11, wherein the one or more one or more control components comprises a switch, button, toggle, or lever.

15. The adaptor of claim 11, wherein the end cap allows for spring adjustment of a spring with the end cap installed to the adaptor.

16. The adaptor of claim 11, wherein the adaptor further comprises:

one or more panels for providing access and coverage over the one or more control components.

* * * * *